United States Patent
Ben Nun et al.

(10) Patent No.: US 11,384,994 B2
(45) Date of Patent: Jul. 12, 2022

(54) THERMAL ENERGY STORAGE ARRAY

(71) Applicant: Nostromo Ltd., Even-Yehuda (IL)

(72) Inventors: Yaron Ben Nun, Even-Yehuda (IL); Eyal Ziv, Tel-Aviv (IL); Nadav Amir, Rehovot (IL)

(73) Assignee: Nostromo Ltd., Even-Yehuda (IL)

( * ) Notice: Subject to any disclaimer, the term of this patent is extended or adjusted under 35 U.S.C. 154(b) by 175 days.

(21) Appl. No.: 16/650,509

(22) PCT Filed: Sep. 25, 2018

(86) PCT No.: PCT/IB2018/001091
§ 371 (c)(1),
(2) Date: Mar. 25, 2020

(87) PCT Pub. No.: WO2019/058170
PCT Pub. Date: Mar. 28, 2019

(65) Prior Publication Data
US 2020/0284527 A1      Sep. 10, 2020

Related U.S. Application Data

(60) Provisional application No. 62/685,147, filed on Jun. 14, 2018, provisional application No. 62/562,562, filed on Sep. 25, 2017.

(51) Int. Cl.
*F28D 20/02* (2006.01)
*F24F 5/00* (2006.01)
(Continued)

(52) U.S. Cl.
CPC .......... *F28D 20/025* (2013.01); *F24F 5/0017* (2013.01); *F25B 9/004* (2013.01);
(Continued)

(58) Field of Classification Search
CPC .............. F28D 20/025; F28D 20/0034; F28D 2020/0021; F28D 20/0056; F24F 5/0017; F25B 9/004; F25D 2500/02
(Continued)

(56) References Cited

U.S. PATENT DOCUMENTS

| | | |
|---|---|---|
| 3,251,192 A | 5/1966 | Rich, Jr. et al. |
| 3,858,805 A | 1/1975 | Shen et al. |

(Continued)

FOREIGN PATENT DOCUMENTS

| | | |
|---|---|---|
| AU | 2015203406 | 7/2015 |
| CA | 2638235 | 2/2010 |

(Continued)

OTHER PUBLICATIONS

International Preliminary Report on Patentability dated Apr. 8, 2021 From the International Bureau of WIPO Re. Application No. PCT/IL2019/051059. (9 Pages).
(Continued)

*Primary Examiner* — Jon T. Schermerhorn, Jr.

(57) ABSTRACT

A thermal energy storage unit is disclosed. The system comprising: a tube having at least one inlet and at least one outlet for a first fluid; a plurality of plate-shaped or box-shaped capsules having a second fluid therein, wherein the plurality of capsules is arranged inside the tube to form a plurality of stacks of capsules; wherein: the first fluid is a heat transfer fluid for exchanging heat with the second fluid; the second fluid is a phase-change medium; wherein a plurality of defined narrow flow paths for the first fluid is provided between the capsules. The defined flow paths increase the efficiency of the system.

24 Claims, 31 Drawing Sheets

(51) Int. Cl.
*F25B 9/00* (2006.01)
*F28D 20/00* (2006.01)

(52) U.S. Cl.
CPC ...... *F28D 20/0034* (2013.01); *F25D 2500/02* (2013.01); *F28D 2020/0021* (2013.01)

(58) Field of Classification Search
USPC .......................................................... 165/10
See application file for complete search history.

(56) References Cited

U.S. PATENT DOCUMENTS

| | | | |
|---|---|---|---|
| 4,203,489 A | 5/1980 | Swiadek | |
| 4,205,656 A | 6/1980 | Scarlata | |
| 4,259,401 A | 3/1981 | Chahroudi et al. | |
| 4,262,653 A | 4/1981 | Holland | |
| 4,344,414 A | 8/1982 | Balch | |
| 4,347,892 A * | 9/1982 | Clyne | F28D 20/02 126/645 |
| 4,442,826 A * | 4/1984 | Pleasants | F24D 11/003 52/173.3 |
| 4,462,390 A | 7/1984 | Holdridge et al. | |
| 4,471,834 A | 9/1984 | Schlote | |
| 4,495,937 A | 1/1985 | Fisher | |
| 4,532,917 A | 8/1985 | Taff et al. | |
| 4,612,912 A | 9/1986 | Lampe | |
| 4,656,836 A | 4/1987 | Gilbertson | |
| 4,757,690 A * | 7/1988 | Holowczenko | F24F 5/0017 165/905 |
| 4,827,735 A | 5/1989 | Foley | |
| 4,924,935 A | 5/1990 | Van Winckel | |
| 5,059,228 A | 10/1991 | Cheng | |
| 5,072,596 A | 12/1991 | Gilbertson et al. | |
| 5,090,207 A | 2/1992 | Gilbertson et al. | |
| 5,678,626 A | 10/1997 | Gilles | |
| 7,856,843 B2 | 12/2010 | Enis et al. | |
| 7,905,110 B2 | 3/2011 | Reich et al. | |
| 9,568,235 B2 | 2/2017 | Dobbs | |
| 10,591,224 B2 * | 3/2020 | Bergan | F28D 20/00 |
| 2002/0000306 A1 | 1/2002 | Bradley | |
| 2007/0006586 A1 | 1/2007 | Hoffman et al. | |
| 2008/0219651 A1 * | 9/2008 | Nayef | F24H 7/0208 392/485 |
| 2009/0090109 A1 | 4/2009 | Mills et al. | |
| 2011/0049908 A1 | 3/2011 | Chung | |
| 2011/0286724 A1 * | 11/2011 | Goodman | F28D 20/0056 165/104.31 |
| 2013/0134780 A1 * | 5/2013 | Parsonnet | G06Q 10/06 307/25 |
| 2014/0102662 A1 | 4/2014 | Grama et al. | |
| 2014/0214231 A1 | 7/2014 | Parsonnet et al. | |
| 2014/0284021 A1 * | 9/2014 | Laurberg | F01K 3/12 165/10 |
| 2015/0053367 A1 * | 2/2015 | Parkinson | B23P 15/26 165/10 |
| 2015/0060008 A1 | 3/2015 | Wirz et al. | |
| 2016/0076821 A1 * | 3/2016 | Kopko | F25B 40/02 165/10 |
| 2016/0123680 A1 | 5/2016 | Lee et al. | |
| 2016/0195320 A1 | 7/2016 | Konovalov | |
| 2017/0119028 A1 | 5/2017 | Kobayashi et al. | |
| 2018/0003445 A1 * | 1/2018 | Bergan | F28D 20/00 |
| 2021/0396406 A1 | 12/2021 | Ben Nun et al. | |

FOREIGN PATENT DOCUMENTS

| | | |
|---|---|---|
| CN | 101586853 | 11/2009 |
| CN | 201662262 | 12/2010 |
| CN | 202835911 | 3/2013 |
| CN | 104457020 | 3/2015 |
| EP | 0012757 | 7/1980 |
| FR | 3038376 | 6/2015 |
| GB | 2489811 | 10/2012 |
| JP | 61-265493 | 11/1986 |
| JP | 63-273787 | 11/1988 |
| JP | 2013-228186 | 11/2013 |
| JP | 2016-029333 | 3/2016 |
| WO | WO 2006/136860 | 12/2006 |
| WO | WO 2014/091216 | 6/2014 |
| WO | WO 2016/099289 | 6/2016 |
| WO | WO 2016/195485 | 12/2016 |
| WO | WO 2017/001558 | 1/2017 |
| WO | WO 2017/151606 | 9/2017 |
| WO | WO 2017/151612 | 9/2017 |
| WO | WO 2019/058170 | 3/2019 |
| WO | WO 2020/065649 | 4/2020 |
| WO | WO 2020/194315 | 10/2020 |
| WO | WO 2020/194316 | 10/2020 |

OTHER PUBLICATIONS

International Preliminary Report on Patentability dated Oct. 7, 2021 From the International Bureau of WIPO Re. Application No. PCT/IL2020/050373. (7 Pages).
Communication Pursuant to Article 94(3) EPC dated Jan. 29, 2021 From the European Patent Office Re. Application No. 18783085.6. (4 Pages).
Translation Dated Mar. 29, 2021 of Notification of Office Action dated Mar. 5, 2021 From the State Intellectual Property Office of the People's Republic of China Re. Application No. 201880075534.7. (11 Pages).
Notification of Office Action dated Mar. 5, 2021 From the State Intellectual Property Office of the People's Republic of China Re. Application No. 201880075534.7. (10 Pages).
International Preliminary Report on Patentability dated Apr. 9, 2020 From the International Bureau of WIPO Re. Application No. PCT/IB2018/001091. (9 Pages).
International Search Report and the Written Opinion dated Jan. 15, 2020 From the International Searching Authority Re. Application No. PCT/IL2019/ 051059. (13 Pages).
International Search Report and the Written Opinion dated Nov. 30, 2018 From the International Searching Authority Re. Application No. PCT/IB2018/001091. (16 Pages).
Soares et al. "Review of Passive PCM Latent Heat Thermal Energy Storage Systems Towards Buildings' Energy Efficiency", Energy and Buildings, 59: 82-103, Apr. 2013.
International Search Report and the Written Opinion dated Jul. 15, 2020 From the International Searching Authority Re. Application No. PCT/IL2020/050374. (11 Pages).
International Search Report and the Written Opinion dated Jun. 30, 2020 From the International Searching Authority Re. Application No. PCT/IL2020/050373. (11 Pages).
International Preliminary Report on Patentability dated Oct. 7, 2021 From the International Bureau of WIPO Re. Application No. PCT/IL2020/050374. (8 Pages).
Translation Dated Oct. 13, 2021 of Notification of Office Action dated Sep. 10, 2021 From the State Intellectual Property Office of the People's Republic of China Re. Application No. 201880075534.7. (11 Pages).
Notification of Office Action dated Sep. 10, 2021 From the State Intellectual Property Office of the People's Republic of China Re. Application No. 201880075534.7. (11 Pages).

* cited by examiner

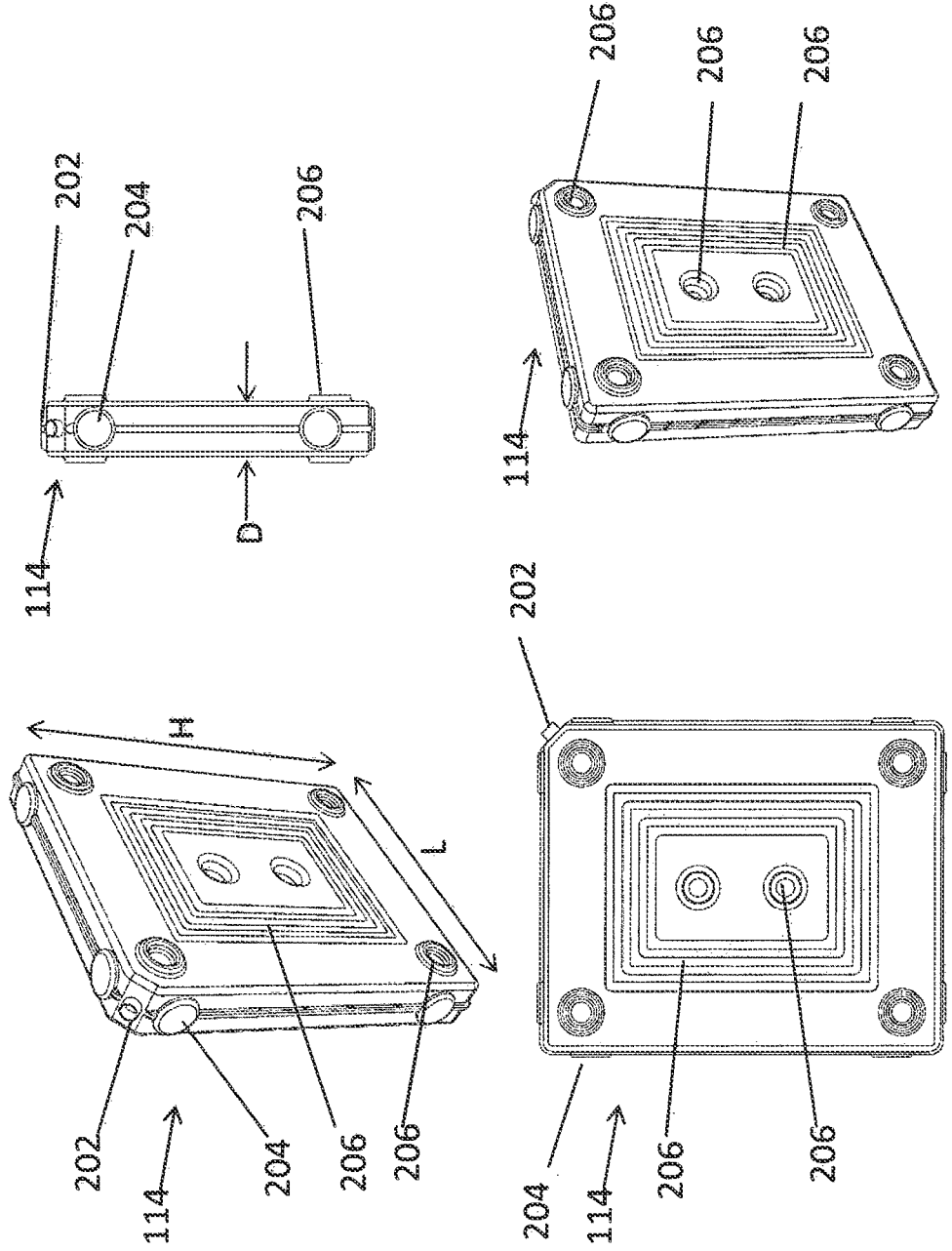

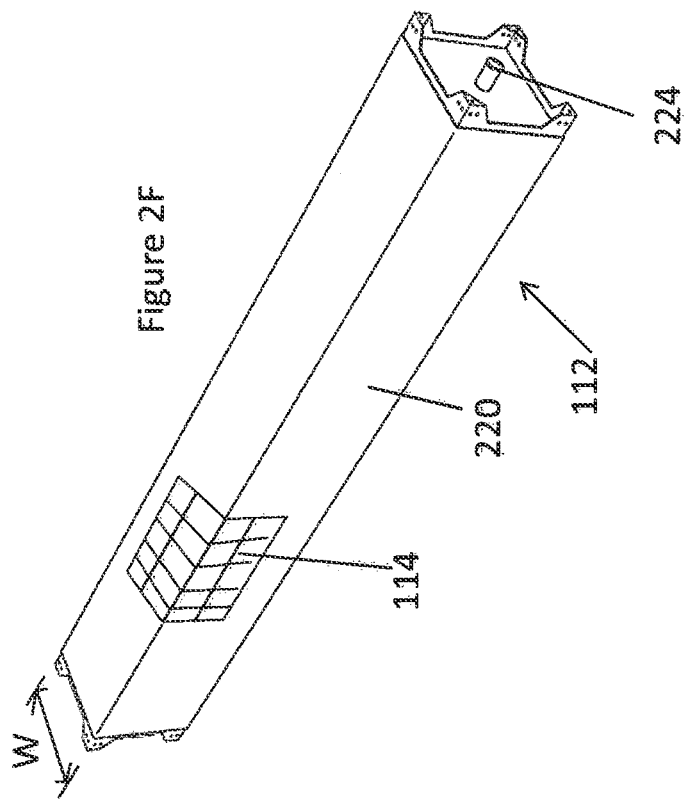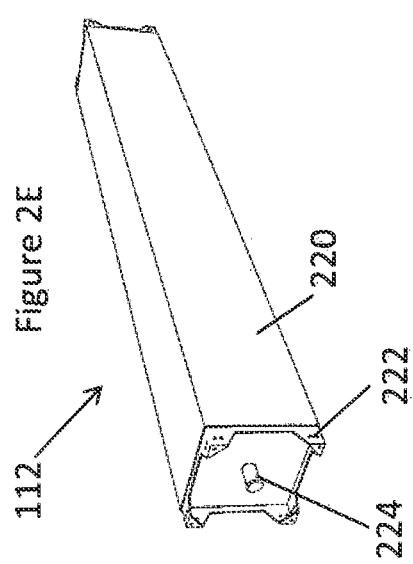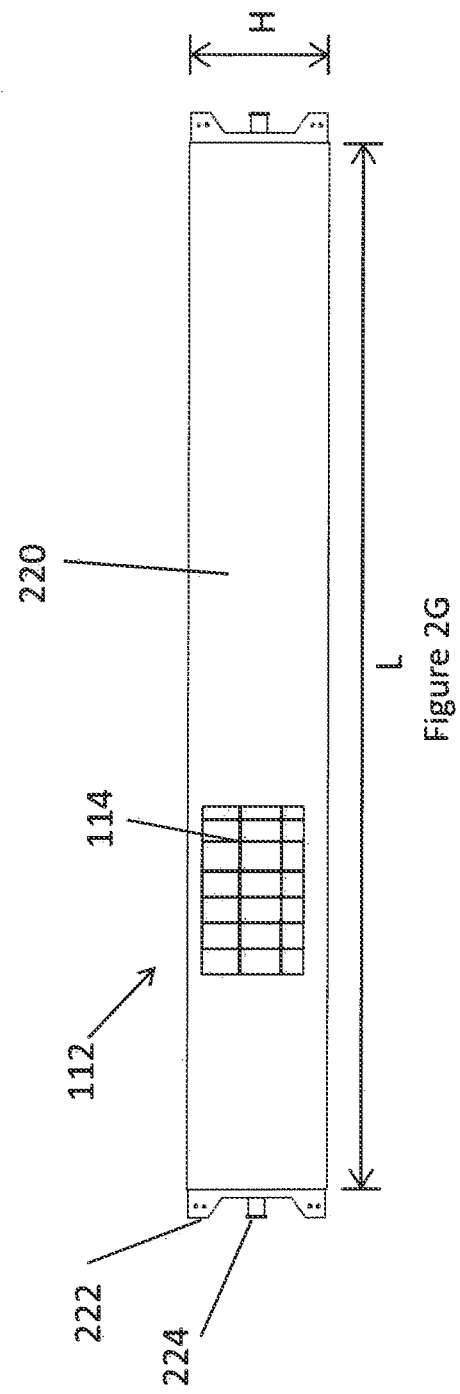

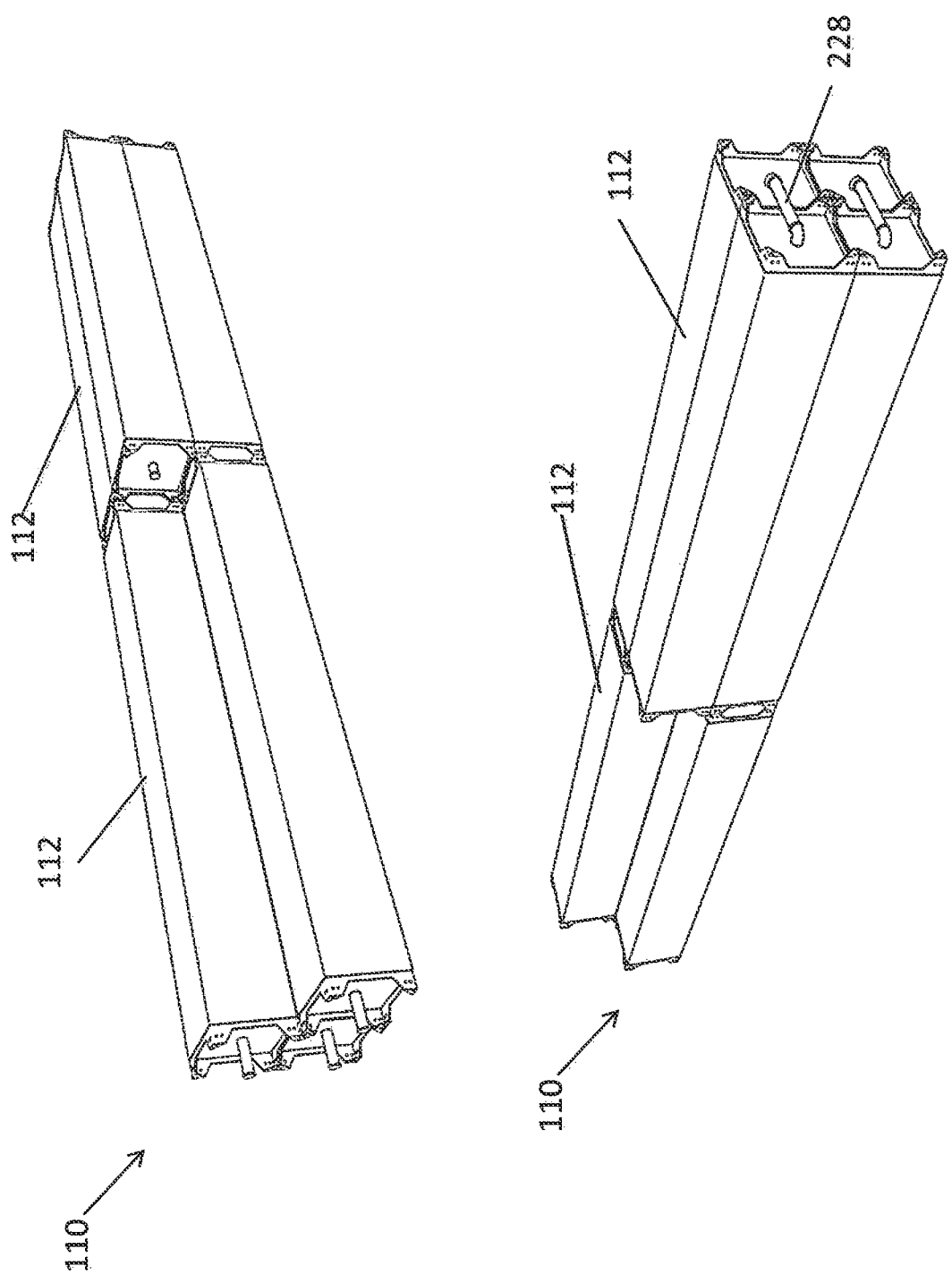

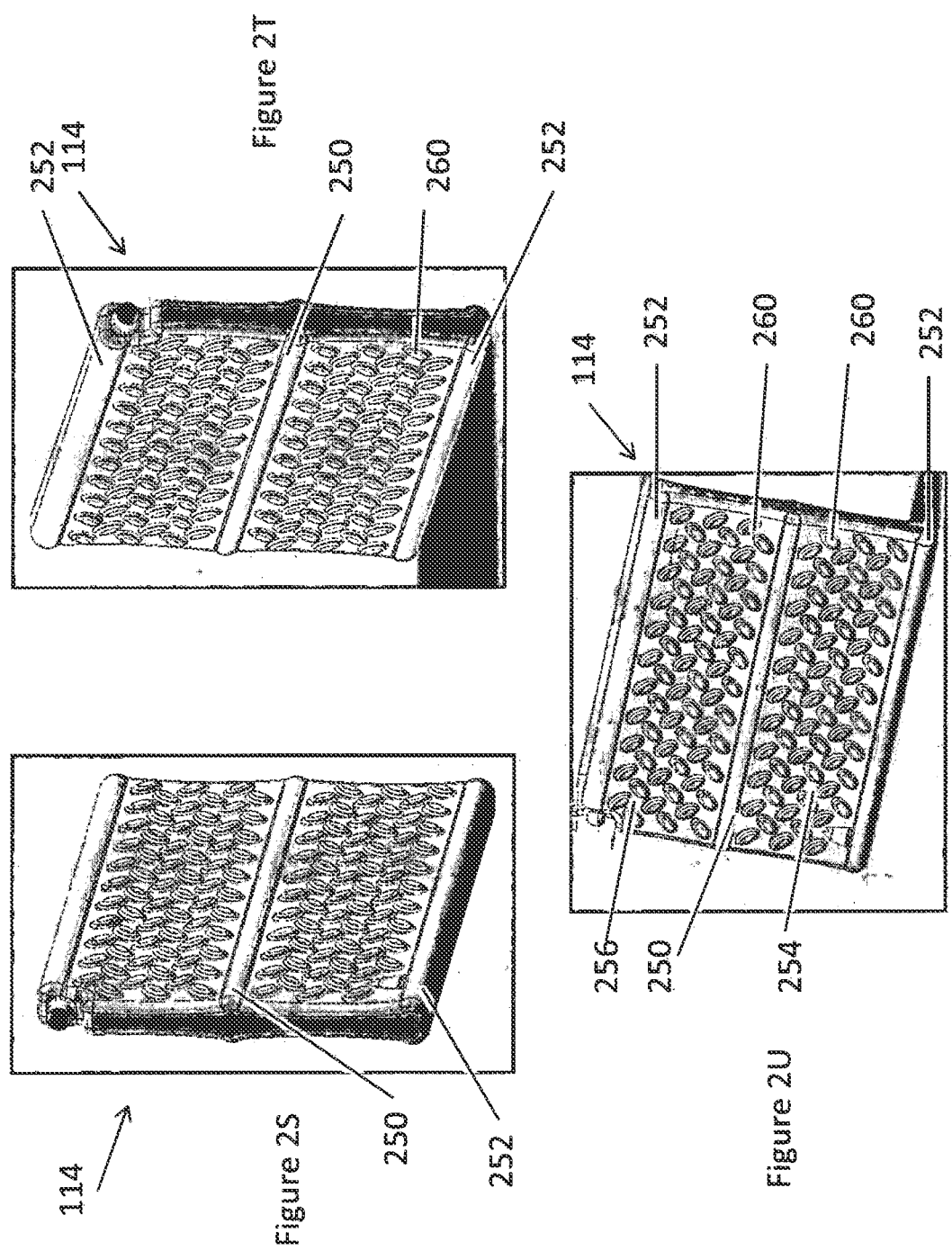

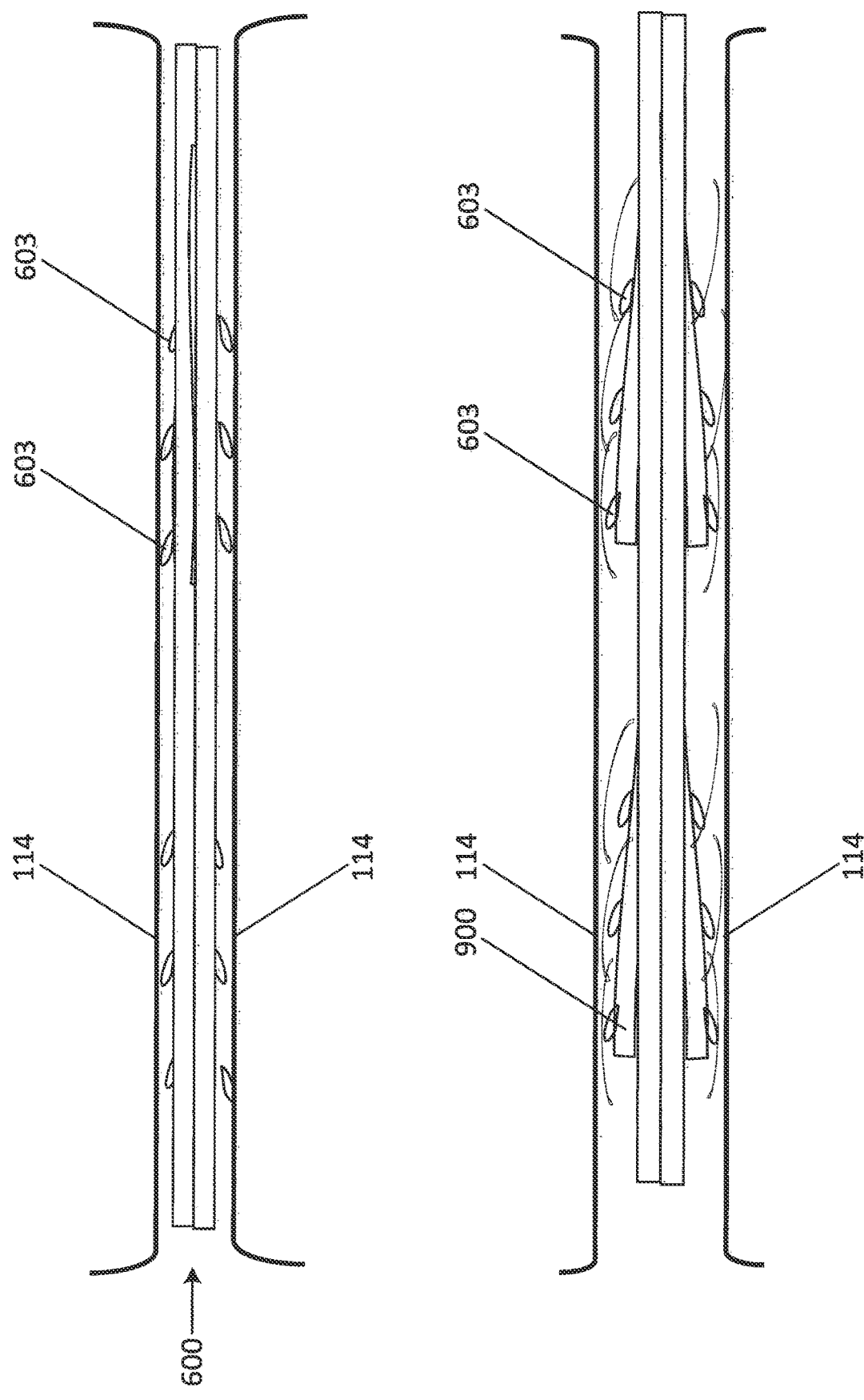

THERMAL ENERGY STORAGE ARRAY

RELATED APPLICATIONS

This application is a National Phase of PCT Patent Application No. PCT/IB2018/001091 having International filing date of Sep. 25, 2018, which claims the benefit of priority under 35 USC § 119(e) of U.S. Provisional Patent Application Nos. 62/685,147 filed on Jun. 14, 2018 and 62/562,562 filed on Sep. 25, 2017. The contents of the above applications are all incorporated by reference as if fully set forth herein in their entirety.

FIELD OF THE INVENTION

The invention relates to a system and method for thermal energy storage and particularly to an array of configurable thermal energy storage bricks.

BACKGROUND OF THE INVENTION

Many studies of energy consumption in the developed world have pointed to peak energy (electricity) consumption occurring during less than 400-300 hours annually (5% of the time). A substantial amount of this peak energy demand may be attributed to structural cooling systems such as chillers, air conditioning or space heating systems relying on heat pumps. There is therefore a growing need to provide efficient and cost effective cooling systems that can counterbalance the grid's fluctuation.

One response to this need has been the development of a thermal energy storage systems, especially ice storage systems, that store cold or hot energy by running grid electricity consuming chillers or heat pumps during off-peak hours and then discharge the stored energy during peak or other hours. The primary disadvantages of current systems are their incompatibility with a commercial building, lack of modularity, and their significant footprint—often requiring the usage of expensive real estate assets of a building in order to provide sufficient thermal energy storage; as a result, this method of storing energy is almost totally absent from the commercial sector (office buildings, shopping malls, hotels, hospitals and so on), which is a great contributor to the peak demand phenomena.

The most common type of such a conventional system for storing thermal energy is known as an "ice-on-coil" storage system. These systems comprise a tank filled with water/ice as a phase change medium (PCM) for storing heat, especially by utilizing the phase change of liquid water into ice. These systems further comprise a coil that is placed inside the tank in the water in order to exchange heat with the water/ice. While charging this type of system, ice is built up around the coil in order to form a massive block. These systems suffer from a significant loss of efficiency, since the freezing of the water starts regularly at or on the coil, and frozen water is quite a good thermal insulator. Hence, a layer of ice on the coil increases its thickness when the tank is cooled to below around zero degrees Celsius with the coil in order to store latent heat energy. Consequently, an increasing insulation layer makes it increasingly difficult to freeze the whole volume of the storage tank. This is known as the "ice-build-up" problem. Conventional systems thus have to use very low temperatures for cooling the coil, which is inefficient. Furthermore, working at too low temperatures hurts the chiller's COP (coefficient of performance).

Furthermore, a different type of conventional thermal energy storage systems is known as "encapsulated ice" storage systems, wherein a plurality of containers that contain water as PCM for storing energy is placed inside a tank. A further medium, for example a water-glycol mixture, for exchanging heat with the water/ice inside the containers is pumped through the tank on demand. However, until now this type of a thermal energy storage system also lacks efficiency and reliability.

One of the inefficiencies of current systems, especially of "encapsulated ice" and "ice on coil" systems that use water/ice, is slow or inconsistent ice nucleation that results in inefficient thermal energy storage and discharge. The inconsistent ice nucleation and generation is generally caused by super-cooled water that is not freezing at the desired temperature.

A still further limitation of current systems is a limited ratio between storage fluid (water) volume and total system volume and/or the limited contact between the storage fluid (water) and the heat transfer fluid (such as glycol) either due to the growing water barrier between the two inside the capsules as the discharge cycle advances, to a low packing factor of the storage fluid containers, or poor design of the storage fluid containers such that they do not expose a great enough surface area to the heat transfer fluid or block the flow of the heat transfer fluid, thus greatly reducing the efficiency of the thermal storage. A further limitation is the inefficient discharge process that does not result in melting of all of the ice stored in the system. Furthermore, conventional systems provide an insufficient and especially dropping discharge rate, which is not sufficient to support load demands. In other words, conventional ice storage systems have usually the problem of an unstable and a degrading discharge behavior/discharge curve.

A further problem of known thermal energy storage systems that use water/ice as energy storage medium is that they suffer from a degradation of system performance over their lifetime, for example due to material fatigue or changes of the flow properties of the system. Especially with "current encapsulated ice systems" the repeated expansion and contraction of the volume of water while freezing can create such problems. One further problem with conventional thermal energy storage systems that use water as PCM is a power rate drop in the second half of the discharge cycle. This phenomenon is caused by the melted water within capsules that act as barrier to the thermal heat exchange/conduction, wherein this thermal barrier gets constantly larger as the ice melts.

It would therefore be desirable to provide a thermal energy storage system with a modular installation and a footprint that can be adapted to fit the structure to be serviced and that further provides improved thermal energy storage.

SUMMARY OF THE INVENTION

According to some embodiments of the present invention a thermal energy storage array comprises a plurality of ice bricks wherein each of said ice bricks comprises a plurality of capsules; wherein said ice bricks are interconnected for fluid communication of a first fluid flowing through said ice bricks and wherein said ice bricks are configured in a modular structural arrangement comprising one or more of: said bricks are stacked on top of one another; said bricks are laid end to end; or said bricks are laid next to one another. Preferably the array further comprises insulation panels surrounding the outer surface of said modular structural arrangement of said bricks. On one hand, these insulation panels are provided for surrounding the outside surfaces of the module. On the other hand, insulation panels are avoided for non-external surfaces. The insulation panels are designed to be attached over one or more bricks according to a planned modular arrangement of bricks. This results in a homogenous ice-brick structure, an easy installation, which is also easy to disassemble. This configuration saves on the total insulation needed as only the outer surface of the complete array needs to be insulated and not every surface of every brick.

Preferably said capsules comprise a second fluid. Preferably said second fluid comprises water. Preferably the array further comprises a fluid distribution system. Preferably said first fluid has a lower freezing point than said second fluid. Preferably said second fluid comprises an ice nucleation agent. Preferably said ice nucleation agent is quartz. Preferably said brick comprises between 65% and 85% of said second fluid contained inside said capsules. Preferably the array further comprises a TES chiller for cooling said first fluid.

Preferably the condensation part of said TES chiller is cooled by a third fluid which also cools the load in the structure serviced by said array. Preferably the array further comprises an air compressor. Preferably said capsule comprises a filling nozzle placed on an upper corner of said capsule to enable filling of said capsule to a maximum with said second fluid. Preferably said capsule comprise one or more of narrow-side spacers and broad-side spacers and wherein said spacers create a gap between said capsules when these are packed together inside said brick. Preferably said capsule surface comprises protrusions adapted to increase the turbulent flow of said first fluid around said capsules. Preferably said brick is rectangular. Preferably said brick has a size of 50×50×400 cm. Preferably said brick has a size of 25×25×400 cm. Preferably said brick has a volume of 750-1200 L. Preferably said brick has an energy storage capacity of 15-23 TRH. Preferably said capsule comprises a cyclohexane shape. Preferably said cyclohexane shaped capsules are placed inside said brick to freely settle inside brick.

Preferably said brick is adapted to be positioned underground. Preferably said brick is cylindrical and comprises a pipe comprising a spiral metal reinforcement than runs along the outside of said brick to enable placement of said brick underground. Preferably said capsules are arranged in a fixed position inside said brick. Preferably said bricks further comprise a plurality of spacers inserted between said capsules, wherein said spacers ensure fluid flow of said first fluid through said brick and said spacers maximize turbulent flow when the gap between said capsules increases due to said second fluid melting.

According to some embodiments of the present invention a method for discharging a thermal energy storage (TES) system for cooling of a load comprises: providing a TES system wherein said TES system comprises an array of ice bricks, a controller, and a fluid distribution system and wherein said array is divided by said fluid distribution system into a plurality of subsets of ice bricks; wherein said controller is a computing device; activating by said controller of a first subset of said plurality of subsets such that a first fluid flows through said first subset for cooling of said load; monitoring by said controller of the temperature of said first fluid; when the temperature of said first fluid exceeds a threshold, activating by said controller of a further subset of said plurality of subsets such that a first fluid flows through said further subset for cooling of said load, wherein said further subset is a subset that has not been activated during the active discharging process; and repeating the previous two steps.

Preferably said further subsets are activated in addition to said first subset such that said first fluid flows through all activated subsets. Preferably the method further comprises: determining by said controller whether all of said plurality of said subsets have been activated and when all of said plurality of said subsets have been activated, terminating by said controller of said discharging. Preferably said fluid distribution system comprises at least one pump and at least one flow control mechanism and wherein said activating a subset comprises activating said at least one pump and said at least one flow control mechanism such that said first fluid flows through said subset. Preferably said ice bricks each comprise a container comprising capsules and comprising inlet and outlet piping for enabling fluid communication of said first fluid within said array. Preferably said capsules comprise a second fluid that has a temperature lower than that of said first fluid prior to discharging and wherein said capsules cool said first fluid as said first fluid flows through said ice brick.

According to some embodiments of the present invention a thermal energy storage unit is provided comprising: a tube having at least one inlet and at least one outlet for a first fluid; a plurality of capsules having a second fluid therein, wherein the plurality of capsules is arranged inside the tube; wherein the first fluid is a heat transfer fluid for exchanging heat with the second fluid; the second fluid is a phase-change medium; wherein the average length of an actual flow path of the first fluid from inlet to outlet is larger than a length of the tube.

According to some embodiments of the present invention a thermal energy storage unit is provided comprising: a tube having at least one inlet and at least one outlet for a first fluid; a plurality of plate-shaped capsules having a second fluid therein, wherein the plurality of capsules is stacked inside the tube or wherein the plurality of capsules is arranged inside the tube to form a plurality of stacks of capsules; wherein the first fluid is a heat transfer fluid for exchanging heat with the second fluid; the second fluid is a phase-change medium; wherein a plurality of defined narrow or shallow flow paths for the first fluid is provided between the capsules.

Preferably said thermal energy storage unit has capsules that are adapted such that the flow path is provided in a meander pattern in at least a part of the flow path.

Preferably said thermal energy storage unit is configured such that the tube is rectangular; and a ratio of the length of the tube to its width is in a range of about 4 to 50; and/or a ratio of a width of the tube to its height is in a range of about 0.5 to 2.

Preferably said thermal energy storage unit is configured such that the shape of the tube is rectangular; and a ratio of the length of the tube to its width is in a range from 12 to 20, preferably about 16; and/or a ratio of a width of the tube to its height is about 1.

Preferably said thermal energy storage unit is configured such that a total volume of the second fluid of the plurality of capsules is 50% to 90%, preferably 65% to 85%, of the total volume of the tube. This has proven to be to optimal or near to optimal ratio of the volumes of second fluid to the total volume of the tube. On one hand, there has to be sufficient space for the first fluid in order to be able to exchange heat with the fluid, and on the other hand there should be as much available capacity for storing heat as possible.

Preferably said thermal energy storage unit is configured such that the thermal energy storage is provided such that: a) the inlet and the outlet are provided at the same end of the tube; and that b) a flow of the first fluid from the inlet to the outlet over each capsule is essentially bi-directional. For example, a rubber sealing element which is placed approximately at the middle of the capsule can act as a flow divider for the flow of the first fluid inside the tube. Hence, two generally bi-directional flows of the first fluid can pass by the capsule which can have different temperatures. Consequently, the capsule is affected by two different flows of the first fluid and heated or cooled with two different temperatures such that a temperature gradient is provided inside the capsule. This temperature gradient results in an advantageous circulation of the second fluid (water) inside the capsule, which provides a heat transport effect in the interior of the capsule and which additional acts against the buildup of an isolative barrier of melted water inside the capsule.

Preferably said thermal energy storage unit is configured such that he broad-sides of the box or plate shaped capsules are concave (shaped). Such capsules having concave walls provide a certain flexibility of the walls at least at the center. Hence, the wall of the capsule can flex in order to allow an increase of the volume of the second fluid in its phase change without getting damaged. Moreover, the concave shape of the broad-sides provides narrow-shaped and defined flow paths between capsules that are stacked side by side. Due to the concave shape of the broad-sides of the walls of the capsules, a flow channel for the first fluid is created between neighboring capsules of a stack that is narrow (or shallow). Consequently, the surface-to-volume ratio of this channel as compared to a cylindrical channel is improved, and the surface of the first fluid touching the broad-side of the capsule is increased. Hence, by providing corresponding (narrow) shapes of the flow channel (and the flow path) for the first fluid and the capsules, the heat exchange through the contact surface between capsule and first fluid is improved, wherein this is additionally a space-saving solution. In other words, by providing flat capsules with corresponding flat flow channels between, the heat exchange rate between the capsule and the first fluid can be significantly improved.

Preferably, said thermal energy storage unit is configured such that at least one surface of the capsules comprises protrusions adapted to create or increase a turbulence of the flow of the first fluid through the tube. This increases the efficiency of the system.

Preferably, said thermal energy storage unit is configured such that each capsule of the plurality of capsules is of the same type, or each capsule of the plurality of capsules has the same volume for the second fluid. This lowers manufacturing costs and makes it easier to create stacks of capsules with defined flow paths.

Preferably, said thermal energy storage unit further comprises rigid spacers placed between the capsules. Accordingly, rigid, e.g. grid-type, spacers made from metal or plastic are placed between the capsules' flat walls, wherein the grid may have many shapes: rectangular, rhombus or square holes grid-welded or chain-lock type. The spacers should be sized in such a manner that there is sufficient free space for the capsule wall to expand into, the free space should be greater than 15% of capsule volume but less than 30% of the hypothetical free flow area between the capsules without the spacers. A metal grid could be made of stainless steel rods with a diameter of approximately 2.8 mm, which are welded in square mash configuration sized 310×140 mm with 8 longitudinal rods and 6 transversal rods.

Preferably, said thermal energy storage unit further comprises flexible spacers placed between the capsules, wherein the flexible spacers comprise flaps. These flexible flaps provide a flexible flow control that adjusts itself according to the charging status of the capsules.

Preferably, said thermal energy storage unit is configured such that the capsules are generally box or plate shaped; and the spacers are sized such that a free flow area between the broad-sides of two capsules is in a range of 15% to 30% of the free flow area between the capsules without the spacers.

Preferably, said thermal energy storage unit is configured such that at least one capsule comprises a nucleating agent, preferably quartz. Consequently, the cooling temperature for the capsule can be higher as compared to conventional ice storage systems.

Preferably, said thermal energy storage unit is configured such that the capsules comprise heat transfer strips, which are preferably arranged such that they conduct heat to the interior of the capsule. A problem with conventional capsules containing water is that the heat transfer coefficient of water is very low. Hence, the heat transfer from the very interior of the capsule to its outside is blocked by the water/ice located closer to the wall. Using heat transfer strips solves this problem since they provide an efficient heat transfer also to the interior of the capsule.

Preferably, said thermal energy storage unit is configured such that the heat transfer strips are made of aluminum. This material provides a good heat transfer rate. Alternatively, the heat transfer stripes can be made of another material with a good thermal conductivity, for example stainless steel. Preferably, said thermal energy storage unit is configured such that the heat transfer strips are made an material that has a thermal conductivity k of more than 10 W/(m*K) under standard conditions. Even more preferred, the thermal conductivity k of the strips is larger than 75 W/(m*K) under standard conditions. This further improves the ice generation process inside the capsule.

Preferably, said thermal energy storage unit is configured such that the heat transfer strips have a thickness of 0.4 to 4 mm, a length of 35 to 350 mm and a width of 5 to 10 mm. These dimensions provide a good heat transfer rate to the interior of the capsule. Furthermore, these strips can be easily placed inside a capsule through a small opening.

Preferably, said thermal energy storage unit is configured such that the capsules are generally box or plate-shaped; and the capsules comprise a single filling port at a corner of the capsule. This shape has a high surface-to-volume ratio. This improves the heat exchange rate between first and second fluid.

Preferably, said thermal energy storage unit is configured such that the capsules are generally box or plate shaped; and the capsules comprise ridges such that the capsules are arranged to be spaced to each other. The ridges enable the creation of free spaces for a defined flow path of the first fluid between the capsules. Since the capsules have flat or not in generally flat broad-sides, narrow (or shallow) spaces between two stacked capsules are created. Consequently an improved and defined flow path for the first fluid is created that enables a high heat exchange rate.

Preferably, said thermal energy storage unit is configured such that the outer shape of the tube is prismatic; and a length of the prismatic tube is four times greater that its maximum diameter.

Preferably, said thermal energy storage unit is configured such that the capsules have a base body and protrusions, the protrusions protruding from the base body; the base body is generally a sphere with a first radius; the protrusions have generally the shape of semi-spheres with a second radius; the second radius is at least 50% smaller than the first radius. This preferred embodiment relates to the cyclohexane-shaped capsules, which are discussed later.

Preferably, said thermal energy storage unit is configured such that the protrusions are evenly distributed on the surface of the base body.

Preferably, said thermal energy storage unit is configured such that the capsule has 12 protrusions, and hence is cyclohexane shaped.

According to some embodiments of the present invention, a thermal energy storage system is provided, the system comprising a plurality of thermal energy storage units as mentioned above, the system characterized in that the thermal energy storage units are part of a structural arrangement of a building; wherein the structural arrangement is a wall, a floor or a roof, or a combination of a wall, a floor or a roof.

According to some embodiments of the present invention, a thermal energy storage system is provided, the system comprising a plurality of thermal energy storage units as mentioned above, the system characterized in that a ratio of a combined length of the plurality of tubes to a flow-cut-area is in a range of about 40 to 200, preferably of about 60 and 150; wherein the flow-cut-area is defined as cross sectional free flow area for the first fluid in the tube per capsule.

Preferably, said thermal energy storage system is configured such that the number of tubes is 3 to 5, preferably 4.

Preferably, said thermal energy storage system is configured such that the combined length of the plurality of tubes is from 10 to 20 meters, preferably 16 meters. This did prove to create the optimal heat exchange rate for the system.

According to some embodiments of the present invention, a capsule for a thermal energy storage system or thermal energy storage unit as explained above is provided, wherein the capsule contains an ice nucleation agent, which preferably comprises quartz.

According to some embodiments of the present invention, a capsule for a thermal energy storage system or thermal energy storage unit as explained above is provided, wherein the capsule contains at least one heat conducting element, preferably a metal stripe.

The technical effects of the above mentioned embodiments are explained below in more detail. One of the key performance criteria of thermal storage systems is the average discharge rate relative to the stored capacity which can be maintained through the whole discharge effective period within the required temperature limits. A typical system holding a certain capacity should be able to discharge as much as possible of its stored capacity during, for example, a 4 hour period and maintain a final exit temperature of the first fluid lower than or equal to 5 degrees Celsius.

As a result of the requirements described above the effective heat transfer rate of a given capsule should be as high as possible. In detail, the heat transfer rate of a capsule is governed by:
1. Areas of transfer of the heat, comprising:
   i. active transfer areas of the ice material (e.g., chunk) inside the capsule 715 (the heat transfer starts with the entire internal surface area of the capsule envelope and decreases while the ice material starts to melt and vice versa during ice formation)
   ii. internal areas of the capsule envelope (i.e., the ice/water heat transfer area to the material of the capsule)
   iii. external areas of the capsule's envelope (i.e., the outer heat transfer area to the first fluid)
2. Heat transfer coefficients (HTC), comprising:
   i. the second fluid, i.e., ice to water (melting) or water to ice (freezing).
   ii. further effects of water inside the capsule (i.e., the heat conduction from the inside of the capsule through the water itself)
   iii. the second fluid to the capsule material (the so-called film HTC; i.e., border effects that are e.g. dependent the circulation of the second fluid inside the capsule)
   iv. the capsule material itself, e.g., a polymer (i.e., the heat conduction of the capsule's material itself)
   v. capsule material to first fluid (i.e., border effects that are e.g. dependent on the velocity and turbulence of the first fluid flowing outside the capsule)
3. Temperature differential, comprising:
   i. total temperature differential between the interior of the capsule and the first fluid
   ii. individual differentials per stages 2i to 2v.

Several variables can be considered to be approximately constant: 1ii, 2i, 2ii, 2iii, 2iv, 3i. The rest of the variables change during the process of discharging. In detail:

1i The ice material (chunk) surface area significantly decreases during the discharging process. The rate of decreasing is not necessarily in a linear relationship with the percentage of melted ice.

2v The heat transfer coefficient of the capsule material to the second fluid 120 is highly dependent on the flow characteristic of the second fluid 120. The fact that the space of the flow path keeps on growing due to the melting of ice (the capsules contract to their "as filled by water size") results in a decline of the HTF velocity and the plastic to HTF surface HTC declines with it (not necessarily in linear proportion to the percentage of melted ice, depending on the flow Reynolds number)

The above mentioned embodiments consider several of the above mentioned items 1 to 3. For example, plate or box-shaped capsules provide an increased capsule area relative to its volume. By reducing thickness of the capsules' material by using a rigid polymer, the HTC through the capsules envelope is improved. Providing metal transfer strips inside the capsule improves the ice to water HTC and water HTC. Causing internal circulation of the second fluid inside the capsule by exposing each capsule to bi-directional passes of the first fluid at different temperatures results in an advantageous exchange of volume of the second fluid inside the capsule, which improves the internal HTC of the capsule, since the conduction of heat is facilitated by the circulation. Providing a turbulent flow profile for the flow paths of the first fluid by adding protrusions on the capsule's surface results in a more efficient heat transfer between the capsule's envelope and the first fluid, since again the heat conduction is facilitated by the transport of the first fluid itself. In contrast, a purely laminar flow profile would negatively influence the heat transfer rate, since the velocity of the first fluid at the border of the capsule tends to zero (this is due to a border phenomenon) and hence in the case of a purely laminar flow no or just a small heat transport is provided by the movement of the first fluid itself. Using metal or other materials for spacers or a grid between the capsules results in a turbulent flow profile and defined flow paths. Using variable/flexible spacers which maintain tight flow paths between the spacer and the capsule also increases the heat transfer rate.

To summarize the above, the presented embodiments and aspects of the invention should enable water to become a usable capacitor for energy in a safe, clean, efficient and affordable fashion.

Unless otherwise defined, all technical and scientific terms used herein have the same meaning as commonly understood by one of ordinary skill in the art to which this invention belongs. The materials, methods, and examples provided herein are illustrative only and not intended to be limiting.

The term "ice brick" can be understood as a thermal energy storage unit that is especially adapted to enclosing a heat transfer fluid (i.e., the first fluid) and a plurality of capsules containing the PCM (i.e. the second fluid).

The term "tube" can be understood as an elongated hollow body that has a length that is at least two times, preferable 6 times, larger than its diameter. The cross-section of said tube can be circular-, oval-, square-, rectangular- or polygonal-shaped. Preferably, the cross-section of said tube is rectangular-shaped and essentially constant over its entire length.

The term "capsule" can be understood as an enclosed volume for permanently storing a PCM, such as water or a mixture of water. Additionally, several further components or ingredients can be stored inside this enclosed volume.

The term "heat" refers to thermal energy that can be stored and exchanged.

The efficiency or effectiveness of a heat exchanger is the ratio of the rate of the actual heat transfer in the heat exchanger to the maximum possible heat transfer rate.

A cross-section shows a sectional view in a width direction of the tube.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "controller", "computing device", a "computer", or "mobile device", it should be noted that optionally any device featuring a data processor and the ability to execute one or more instructions may be described as a computer, including but not limited to any type of personal computer (PC), PLC (programmable logic controller), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the figures:

FIGS. 9A and 9B show spacers between capsules.

DESCRIPTION OF SOME EMBODIMENTS OF THE INVENTION

Figure 1A:
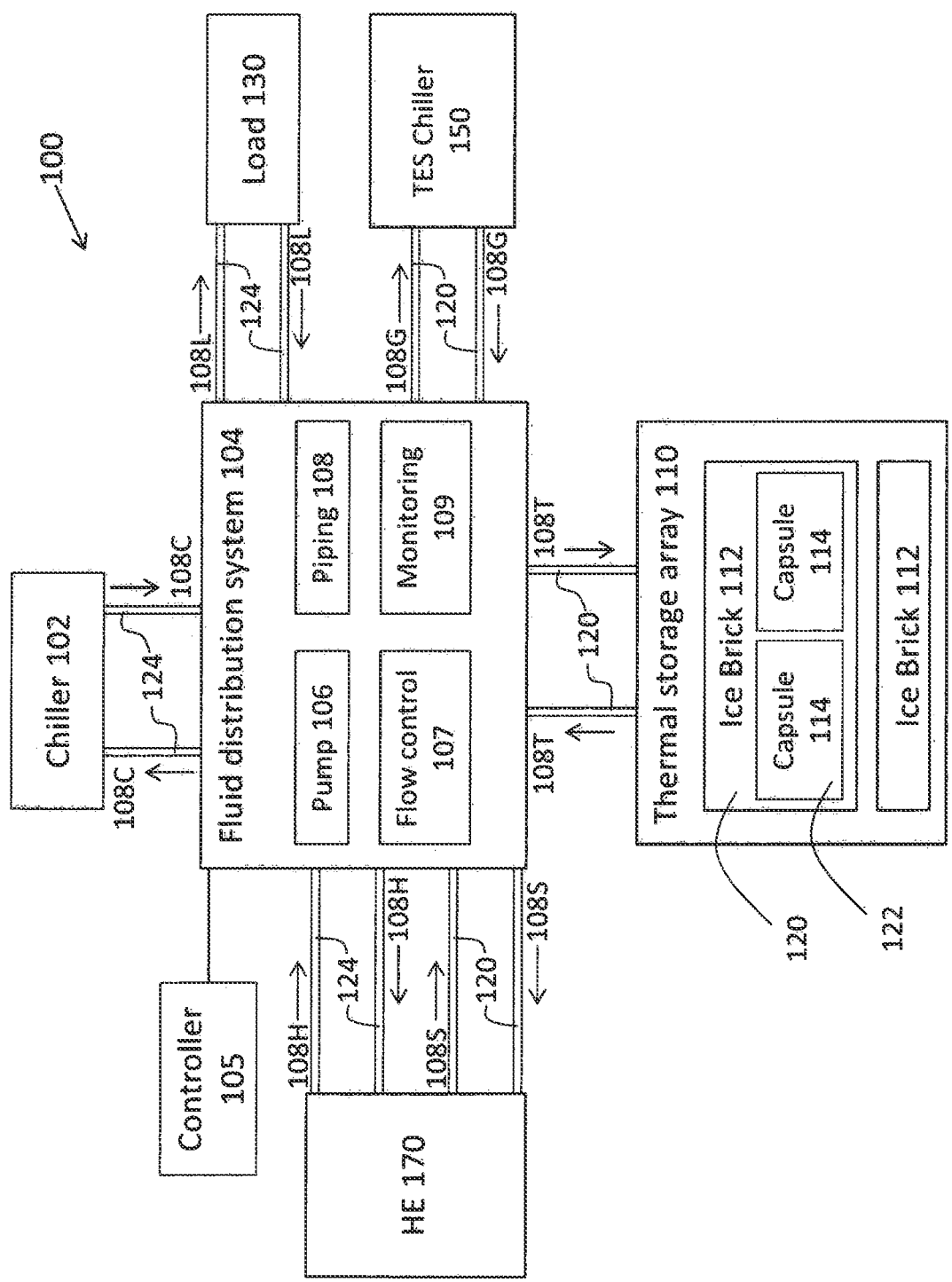
FIGS. 1A-1E are schematic diagrams of a thermal energy storage system according to at least some embodiments of the present invention.

The present invention in at least some embodiments is a system and method for thermal energy storage using configurable ice bricks or thermal energy storage units.

Reference is now made to FIGS. 1A-1E which are schematic diagrams of a thermal energy storage system according to at least some embodiments of the present invention. As shown, thermal energy storage (TES) system 100 uses the HVAC chiller 102 of an air-conditioning (HVAC) system in an installation. Non-limiting examples of an installation include an office building, residential building, shopping mall, airport terminal, factory, server room or similar. When operating without the system 100 of the present invention, HVAC chiller 102 cools a third fluid 124 which is then circulated throughout the installation for cooling load 130. Third fluid 124 is preferably water.

As described above the aim of the present invention is to "store cooling" using the TES 100. Alternatively the same system 100 may be used to store heat. The TES 100 comprises a fluid distribution system 104 which comprises those components necessary for distributing the first fluid 120, second fluid 122 and third fluid 124 throughout system 100. Therefore distribution system 104 comprises one or more pumps 106, piping 108, flow control mechanisms 107 such as valves, and monitoring components 109 for monitoring, for example, temperatures and flow rates inside system 100. Monitoring 109 preferably feeds data to a controller 105 for controlling the freezing and/or cooling process via control of chillers 102 and 150, HE 170, load 130, array 110, and the components of fluid distribution system 104 as described further below. In normal use HVAC chiller 102 cools third fluid 124 which is directed by fluid distribution system 104 from HVAC chiller 102 via pipes 108C to pipes 108L for flow through load 130.

Figure 2H:
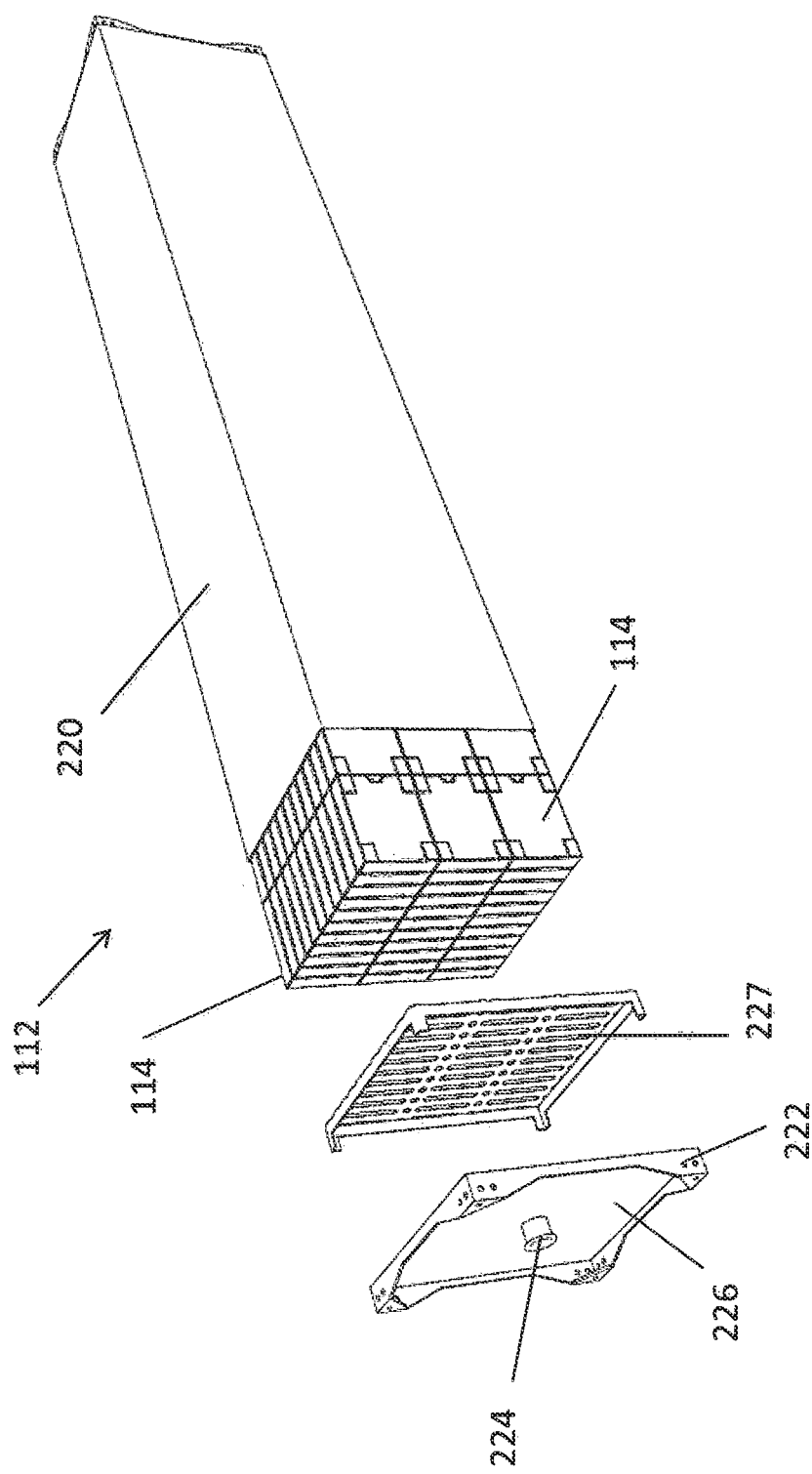
FIGS. 2A-2Y are illustrations of ice bricks, ice capsules and thermal storage arrays according to at least some embodiments of the present invention.
Figure 2K:
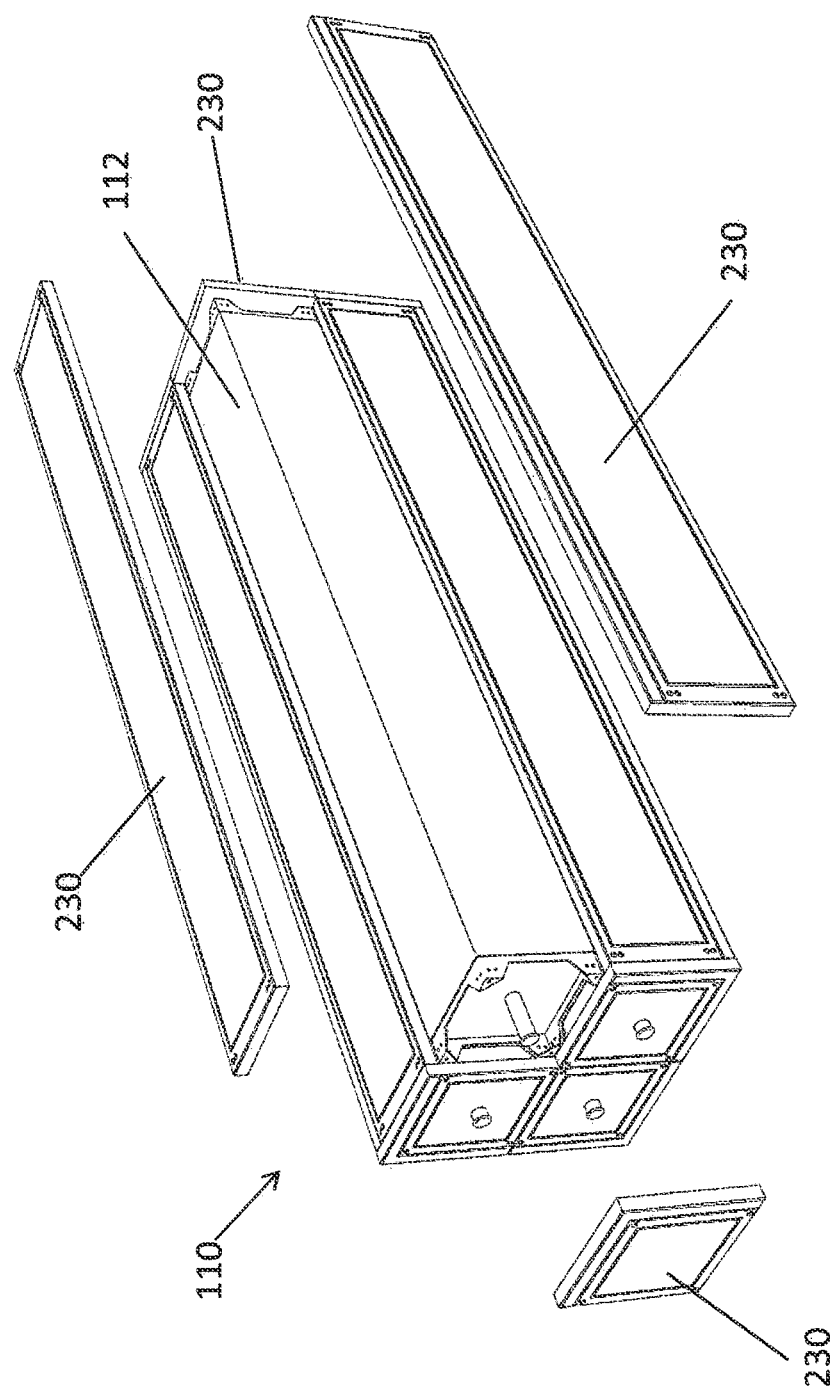
Figure 2L:
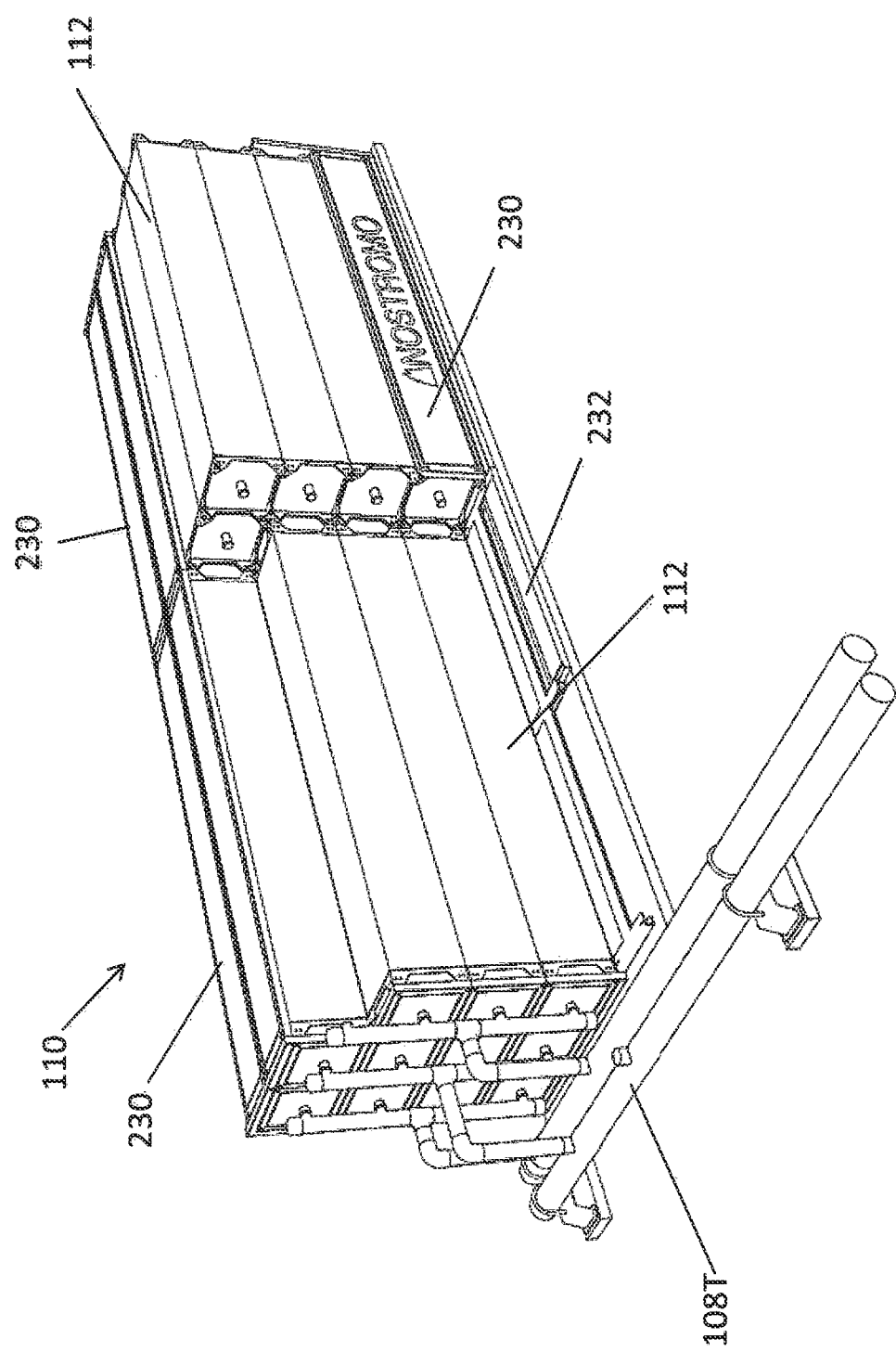

TES 100 further comprises a thermal storage array 110. Array 110 comprises multiple ice bricks 112. Each ice brick 112 comprises multiple ice capsules 114 surrounded by first fluid 120. Embodiments of ice bricks 112 and ice capsules 114 are described further below with reference to FIGS. 2A-2Y and 3. Ice capsules 114 are closed or sealed capsules containing second fluid 122. Second fluid 122 is preferably water such that exposure of capsules 114 to a low temperature first fluid 120 surrounding capsules 114 results in capsules 114 cooling and in turn second fluid 122 cooling and changing phase into ice.

First fluid 120 preferably has a lower freezing point than second fluid 122. Non-limiting examples of a first fluid 120 include ethylene glycol, ethylene glycol mixed with water, salt water, or similar fluids. TES 100 further comprises a TES chiller 150 for cooling first fluid 120 to a temperature lower than the freezing point of second fluid 122. TES chiller 150 is one of air-cooled or water-cooled.

Second fluid 122 is preferably water mixed with an ice nucleation agent. The ice nucleation agent is preferably quartz. The type of quartz used may be any one of but is not limited to: Herkimer Diamond, Rock crystal, Amethyst, Ametrine, Rose quartz, Chalcedony, Cryptocrystalline quartz, Carnelian, chalcedony, Aventurine, Agate, Onyx, Jasper, Milky quartz, Smoky quartz, Tiger's eye, Citrine, Prasiolite, Rutilated quartz, or Dumortierite quartz. Quartz is cheap and easily available and resistant to repeated freezing cycles of the second fluid. Furthermore it raises the required starting temperature of freezing the ice by several degrees. Hence, a nucleation agent improves the efficiency and responsiveness of the thermal energy storage system 100.

Optionally second fluid 122 comprises strips of a metal floating in second fluid 122 inside capsules 114 and causing even distribution of ice formation inside capsules 114. Preferably the metal is aluminum. Preferably the strips are up to 0.5 mm thick. Preferably the strips are up to 30 cm long, preferably the strips are up to 1 cm wide. This optional aspect is explained in more detail with reference to FIGS. 8A-B.

Each ice brick 112 preferably has a long and narrow form factor as shown in FIGS. 2E to 2H to enable efficient heat transfer between capsules 114 and first fluid 120. An ice brick 112 with a long form factor has preferably a length L that is at least three or four times greater than its maximum width W and/or height H. Bricks 112 can preferably be connected end to end creating long linear modules comprising multiple bricks 112. The modular structure and number of bricks 112 used enables control of the rate of energy being discharged to provide for the exact thermal energy storage needs per installation and also provides for flexible installation options as array 110 can be shaped as required. This optional aspect is explained in more detail with reference to FIGS. 8A and 8B.

Capsules 114 are preferably spaced slightly apart within bricks 112 to increase the overall ratio between surface area and volume of the second fluid 122 that is to be frozen. Preferably brick 112 contains between 65% and 85% of second fluid 122. Preferably brick 112 contains 75% of second fluid 122. Capsules 114 preferably comprise polymers such as polyvinyl chloride or other suitable durable and low cost materials. Capsules 114 preferably comprise protrusions or ridges on their outer surface to provide spacing between capsules 114 for flow of first fluid 120 and for increasing turbulence of first fluid 120.

In use of system 100 shown in FIG. 1A, TES chiller 150 cools first fluid 120, preferably to a temperature below the freezing point of second fluid 122. First fluid 120 is pumped from TES chiller 150 via pipes 108G and directed by fluid distribution system 104 via pipes 108T through array 110 to freeze second fluid 122 (also referred to herein as a "charging process"). First fluid 120, which has increased in temperature then exits array 110 via pipes 108T and is directed by fluid distribution system 104 back to the pipes 108G to chiller 150 to be cooled again. During the charging process the provision of first fluid 120 may be continuous or non-continuous. The charging process is preferably stopped when a desired temperature of first fluid 120 is reached within one or more bricks 112, or when a predefined time period has lapsed, or when a predefined amount of energy is stored in array 110. A (fully) charged array 110 usually comprises a plurality of capsules 114 with a second fluid 122 in a frozen state.

Once array 110 has been charged, a cooling process (also referred to herein as a discharge process), is used to cool load 130 using array 110. First fluid 120 inside array 110 is directed via piping 108T to distribution system 104 and through pipes 108S into heat exchanger 170 where first fluid 120 cools third fluid 124. Distribution system 104 then directs cooled third fluid 124 through pipes 108H into pipes 108C to flow through HVAC chiller 102 and then load 130 (via pipes 108L). Alternatively third fluid 124 is directed through pipes 108H in parallel to HVAC chiller 102 directly to load 130 via fluid distribution system 104 to piping 108L. Since third fluid 124 has been cooled by first fluid 120 in HE 170, HVAC chiller 102 preferably does not need to be activated, thus producing energy savings. As first fluid 120 circulates between HE 170 and array 110, capsules 114 containing frozen second fluid 122 cool first fluid 120 which then directly or indirectly cools third fluid 124 and load 130. Preferably the temperature of first fluid 120 entering heat exchanger 170 is between 5 degrees Celsius at the inlet and 10 degrees Celsius at the outlet. As capsules 114 cool first fluid 120, frozen second fluid 122 gradually undergoes a phase change and melts until a point where array 110 is no longer sufficiently cooling first fluid 120 and array 110 is said to be discharged. A (fully) discharged array 110 usually comprises capsules 114 with a second fluid 122 in a liquid state.

The charging process preferably takes place during off-peak hours (hours in which the load on the electrical grid is low) while the discharge process preferably occurs according to the demands of load 130—even during peak hours. The discharge process is preferably stopped when a cutoff temperature of first fluid 120 is reached, or when a predefined time period has elapsed, or when a predefined amount of energy is output from array 110, or under control of load 130 or when the demand for cooling at load 130 has lowered to a desired level.

The direction of flow of first fluid 120 within array 110 during the charging process may be the same, or may differ from the direction of flow of first fluid 120 during the discharge process.

Alternatively, system 100 is used for heating. For heating TES chiller 150 preferably operates as a heat pump. TES Chiller 150 heats first fluid 120, preferably in off peak hours. First fluid 120 is pumped from TES chiller 150 via pipes 108G and directed by fluid distribution system 104 via piping 108T and through array 110 to warm second fluid 122 (also referred to herein as a charging process). First fluid 120, which has decreased in temperature then exits array 110 and is directed by fluid distribution system 104 through pipes 108T and piping 108G to TES chiller 150 to be warmed again. During the warming process the provision of first fluid 120 may be continuous or non-continuous. The warming process is preferably stopped when a desired temperature of first fluid 120 is reached within one or more of bricks 112, or when a predefined time period has lapsed, or when a predefined amount of energy is stored in array 110, and the like. No phase change takes place in the array.

Once array 110 has been charged, a warming process (also referred to herein as a discharge process), is used to warm load 130 using array 110. First fluid 120 inside array 110 is directed via distribution system 104 through pipes 108T and 108S into heat exchanger 170 where first fluid 120 warms third fluid 124. Distribution system 104 then directs warmed third fluid 124 from pipes 108H through pipes 108C to flow through HVAC chiller 102 and then load 130 (via pipes 108L). Alternatively third fluid 124 is directed through pipes 108H in parallel to HVAC chiller 102 directly to load 130 via fluid distribution system 104 to piping 108L. Since third fluid 124 has been warmed by first fluid 120 in HE 170, HVAC chiller 102 (functioning as a heat pump) preferably does not need to be activated as third fluid 124 has been warmed thus producing energy savings. As first fluid 120 circulates between heat exchanger 170 and array 110, capsules 114 containing warmed second fluid 122 warm first fluid 120 which then directly or indirectly warms third fluid 124 and load 130.

The charging process preferably takes place during off-peak hours (hours in which the load on the electrical grid is low) while the discharge process preferably occurs according to the demands of load 130—even during peak hours.

Monitoring 109 of fluid distribution system 104 preferably comprises one or more temperature monitors for monitoring at least one of: The temperature of first fluid 120 before entering array 110; The temperature of first fluid 120 in any location within array 110; The temperature of first fluid 120 after exiting array 110; The temperature of second fluid 122 within one or more capsules 114; The temperature of one or more ice bricks 112; The temperature of first fluid 120 before entering HE 170; and the temperature of first fluid 120 when leaving HE 170. Additionally or alternatively, monitoring 109 comprises one or more flow monitors (not shown) for monitoring at least one of: The flow of the first fluid 120 before, inside and after array 110; and the flow of first fluid 120 before, inside and after HE 170.

While FIGS. 1A-1E show single instances of chillers 102 and 150, HE 170, load 130, array 110, and the components of fluid distribution system 104 it should be understood that TES 100 may comprise any suitable number of these components.

Figure 1B:
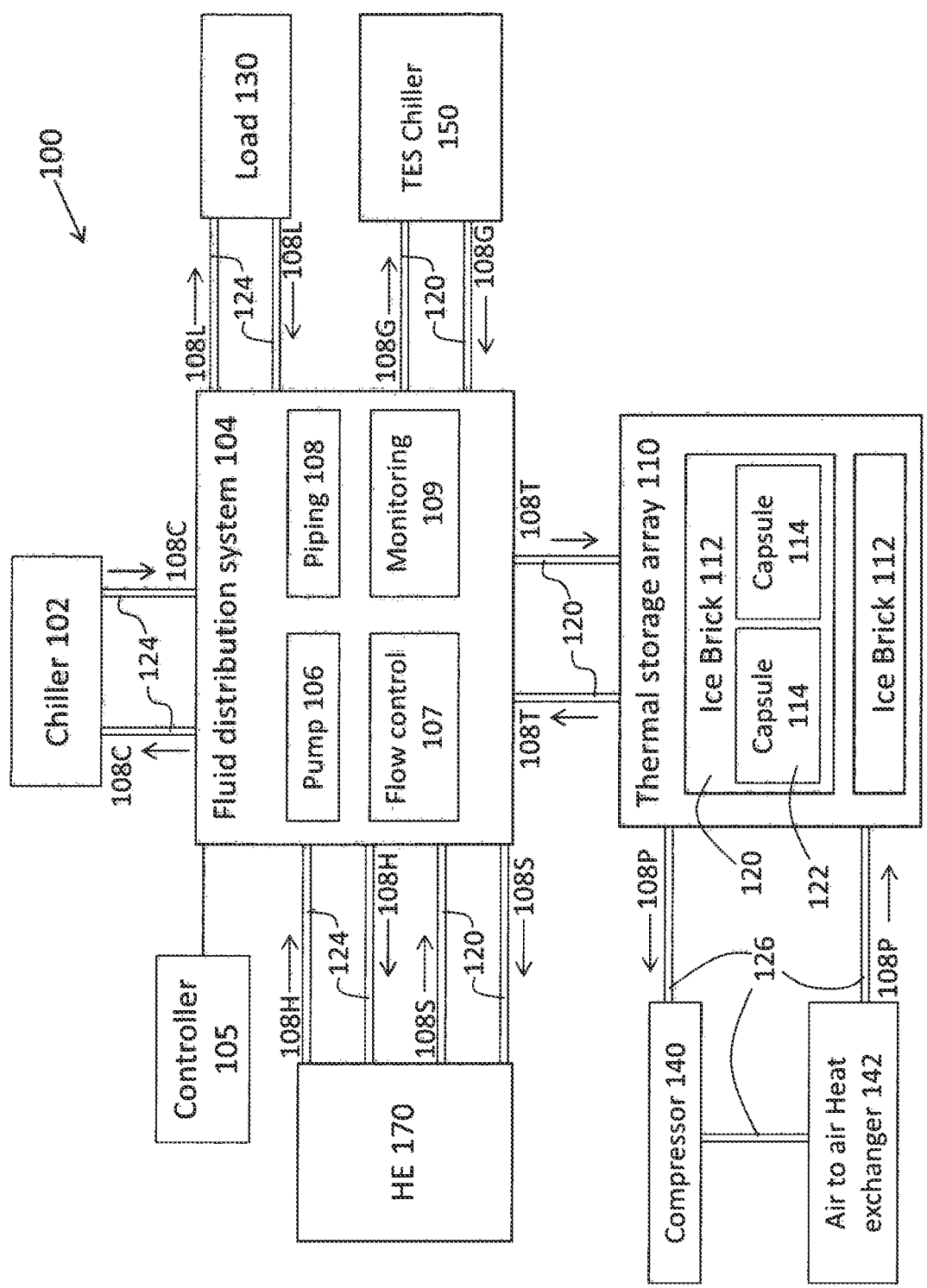

The system 100 of FIG. 1B functions in the same manner as that of FIG. 1A, but the illustrated embodiment comprises an air compressor 140. Compressor 140 draws air 126 from the top of the each of bricks 112. This air 126 is preferably compressed to between 10 and 20 bar resulting in the air 126 heating up as a result of compression. This compressed air 126 is then pumped into the bottom of each of bricks 112 through an air to air heat exchanger 142 and/or an expansion valve (not shown)—dropping to a temperature of between −20 to −30 degrees Celsius. This air 126 is bubbled through each of bricks 112 to further cool the contents before exiting through the top of the bricks 112 at between −5 to +5 degrees Celsius. This cold air 126 is then fed once again into the compressor 140 creating a cooling closed loop 108P. Cooling loop 108P is shown for simplicity as connected directly to thermal storage array 110 but cooling loop 108P is preferably part of fluid distribution system 104 and is controlled as are other piping systems as described herein. In this embodiment second fluid 122 is preferably combined with salt or other suitable material to lower the freezing point of second fluid 122.

Figure 1C:
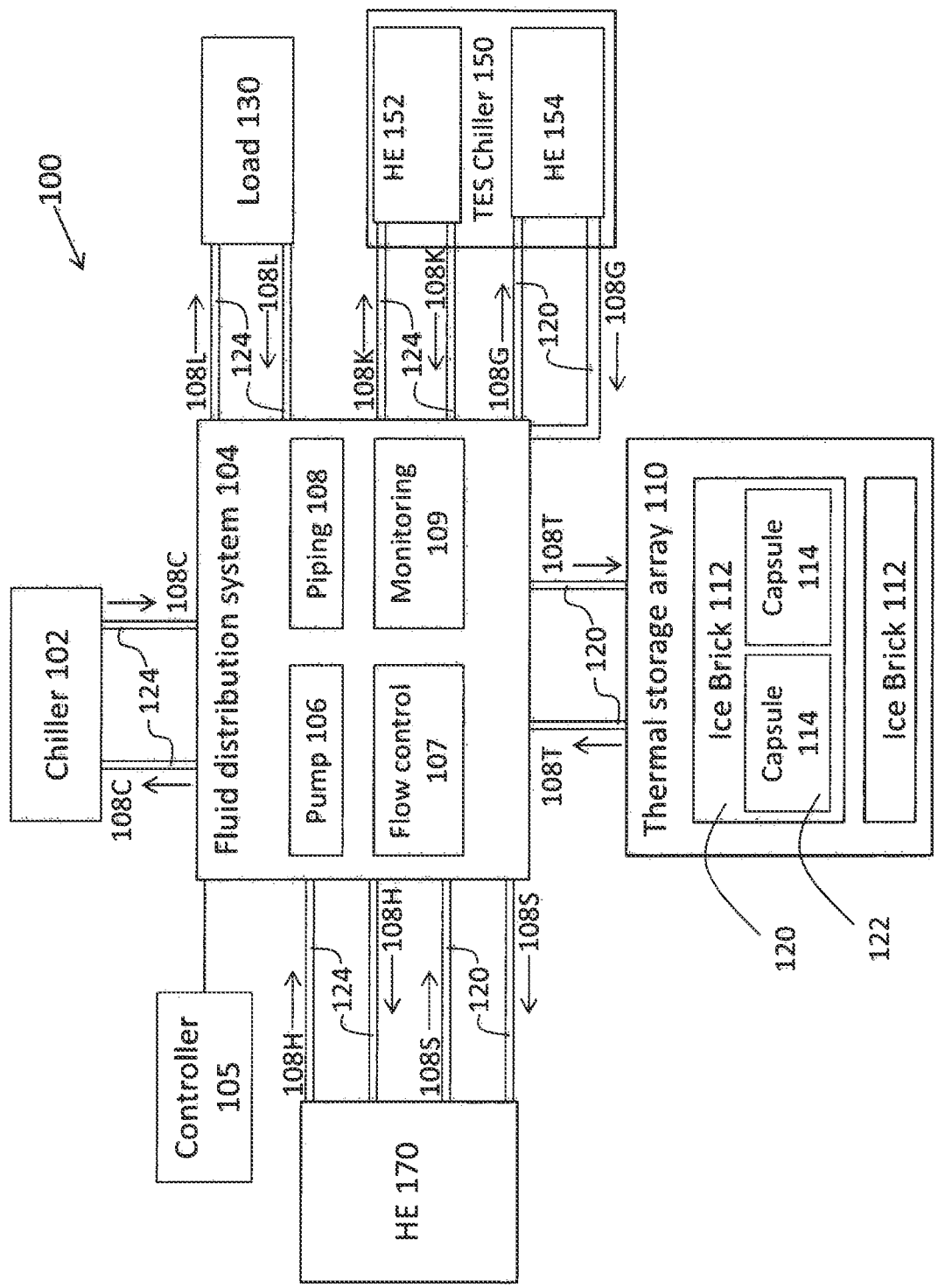

The system of FIG. 1C functions in the same manner as that of FIG. 1A, but where the condensation cycle of TES chiller 150 is water cooled comprises a heat exchanger 152 fed from third fluid 124. In this embodiment load piping 108K is adapted to connect to HE 152 in TES chiller 150. Load piping 108K carries third fluid 124 which has been chilled by HVAC chiller 102—typically to a temperature between but not limited to 7 to 12° C.

TES chiller 150 then cools first fluid 120 via HE 154 to a temperature below the freezing point of second fluid 122 such that first fluid 120 may be pumped through array 110 to freeze second fluid 122 inside capsules 114. The discharging process then takes place in HE 170 as for other embodiments. This arrangement increases the energy efficiency of TES chiller 150 which can utilize the abundant supply of cooled third fluid 124 available when load 130 is partially or entirely not being used for example but not limited to nighttime usage in an office complex. HVAC chiller 102 preferably cools third fluid 124 at night when the outside temperature is lower and electricity costs are lower for more effective and cheaper energy usage. Since water cooled TES chiller 150 is more efficient it can also be smaller than in other embodiments where an air-cooled chiller is used.

Figure 1D:
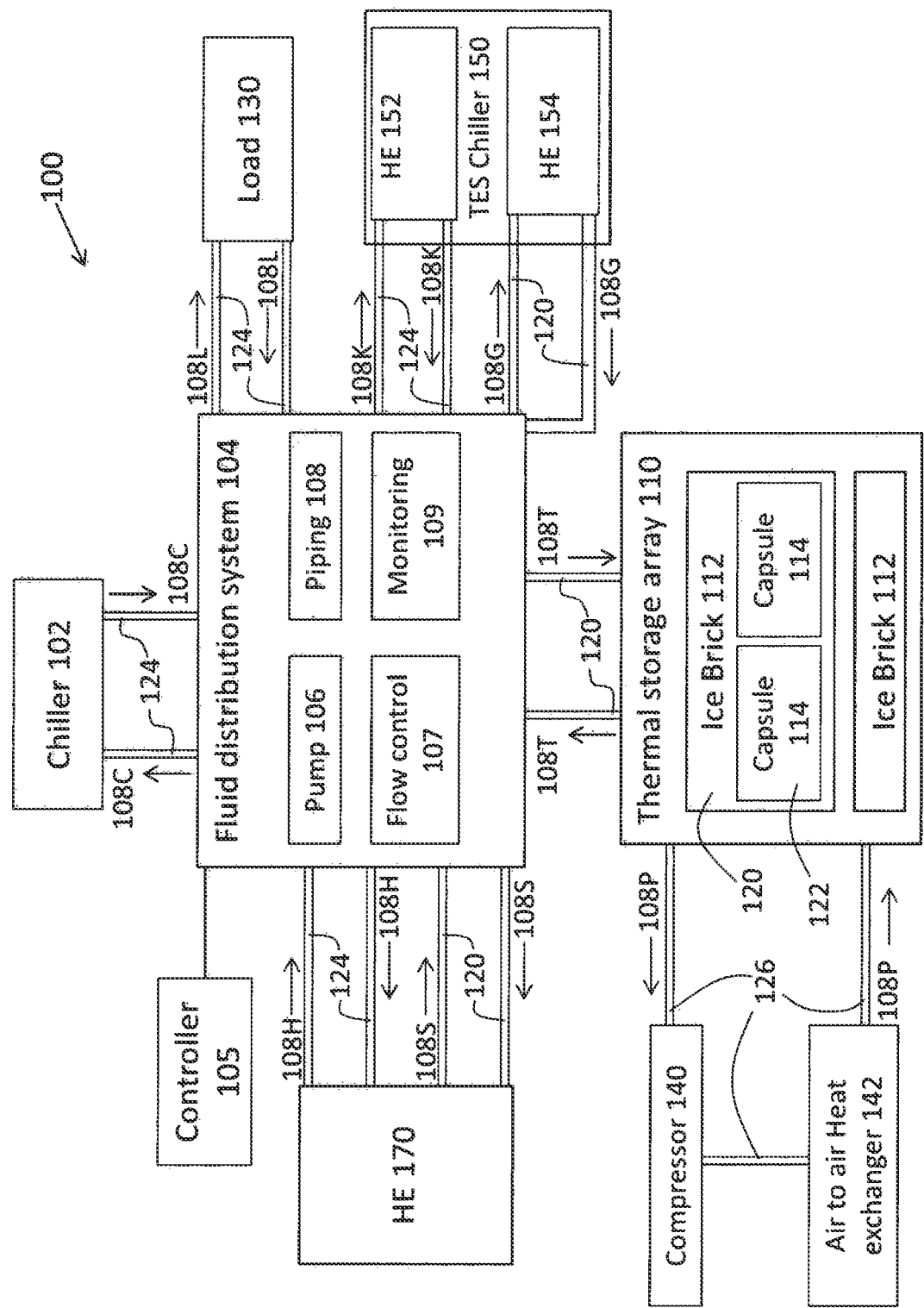

The system of FIG. 1D combines the functionality of FIGS. 1B and 1C to, provide for a TES chiller 150 connected to third fluid via HE 152 that is supplemented by compressive cooling from air compressor 140.

Figure 1E:
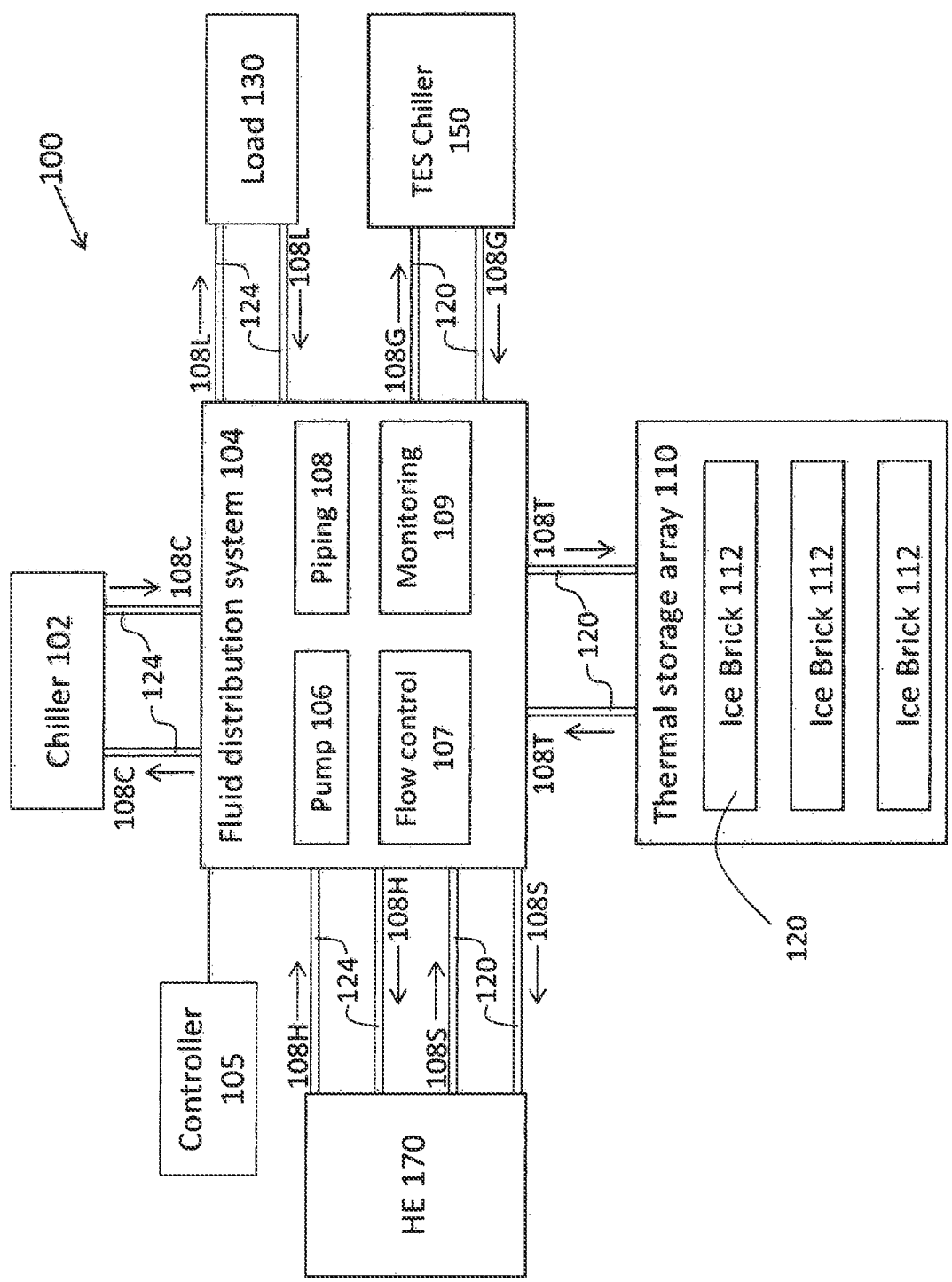

The system of FIG. 1E functions in the same manner as that of FIG. 1A, but in the illustrated embodiment some or all of ice bricks 112 do not comprise capsules 114. In the embodiment of FIG. 1E TES 100 is used to store first fluid 120 in ice bricks 112. Thus first fluid 120 is cooled by chiller 150 and this cooled first fluid 120 is then pumped into ice bricks 112 for storage and use for cooling third fluid (via HE 170) at other times. As above, non-limiting examples of a first fluid 120 include ethylene glycol, ethylene glycol mixed with water, salt mixed with water, or other combinations of these or other fluid to form "slushes" or similar fluids.

Figure 2M:
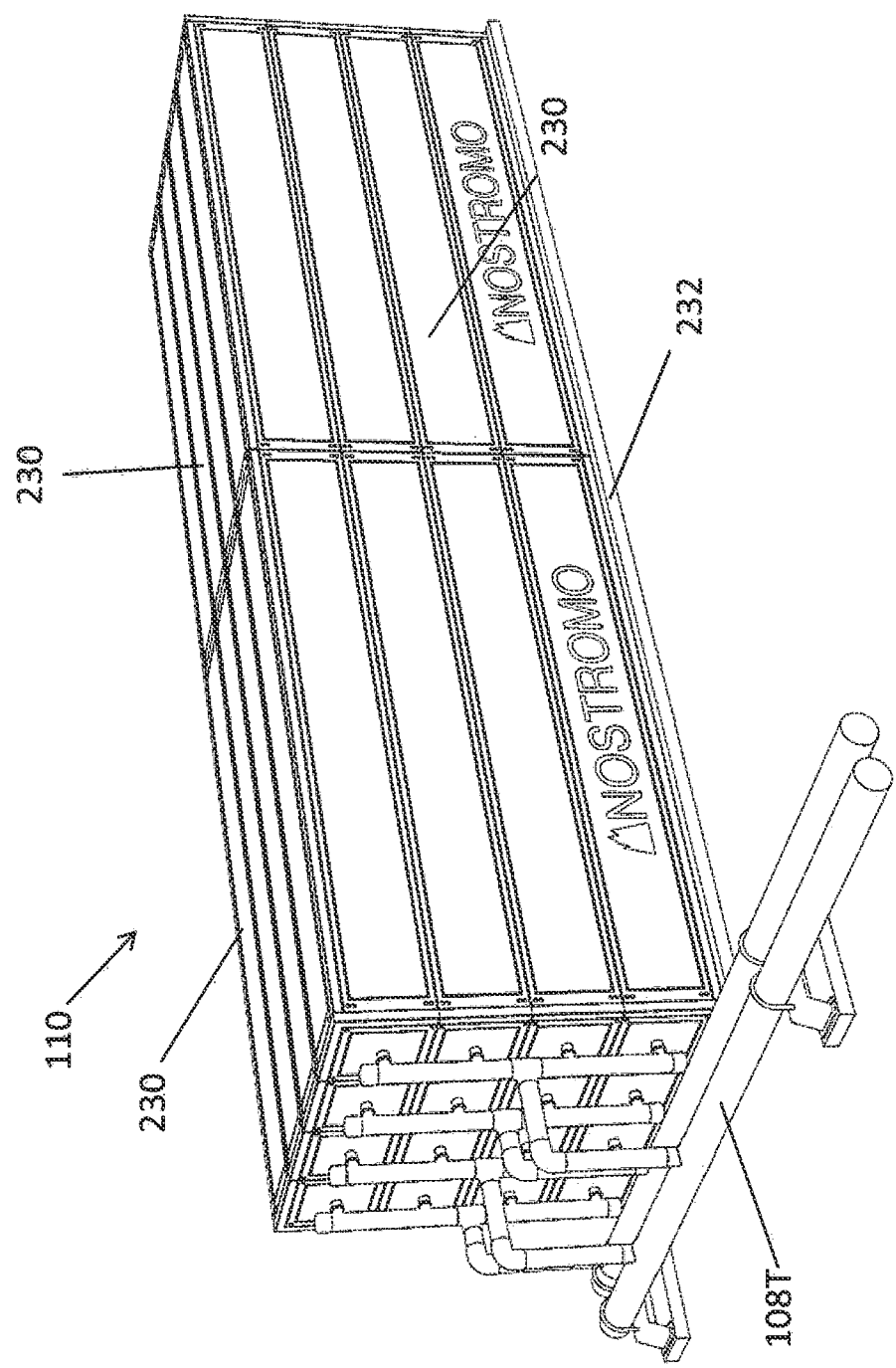
Figure 2N:
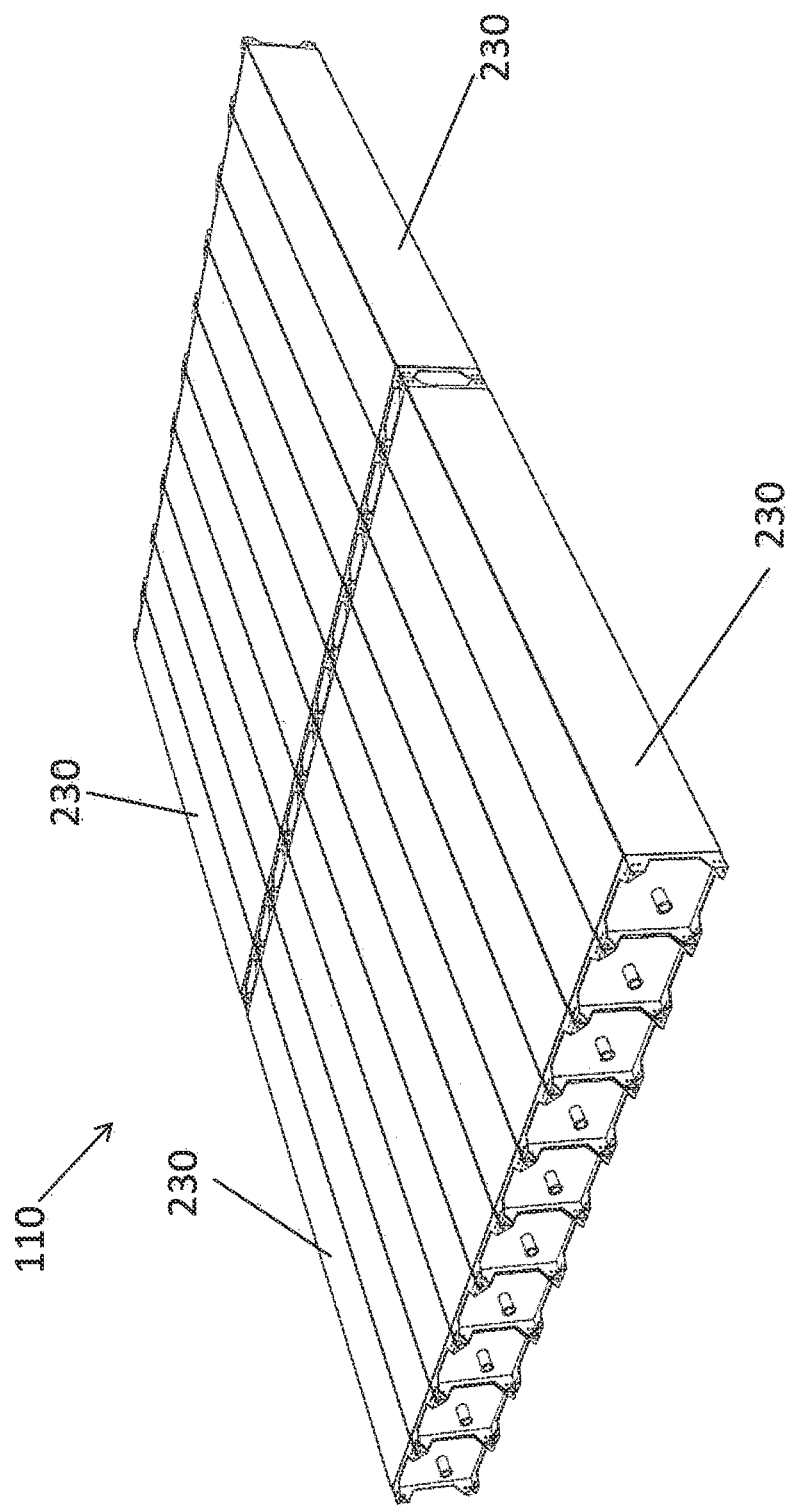
Figure 2P:
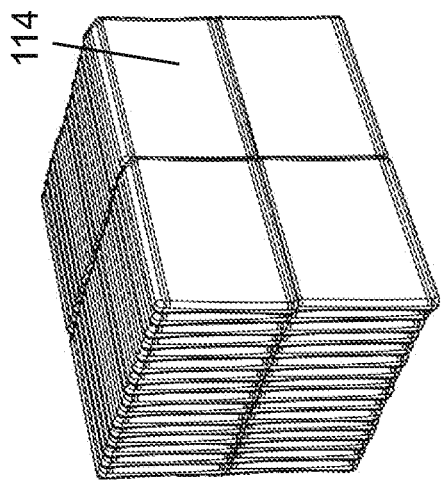
Figure 2R:
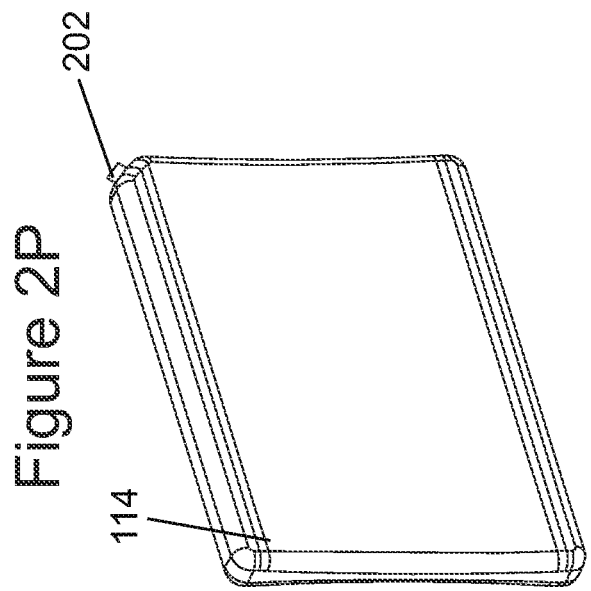
Figure 2O:
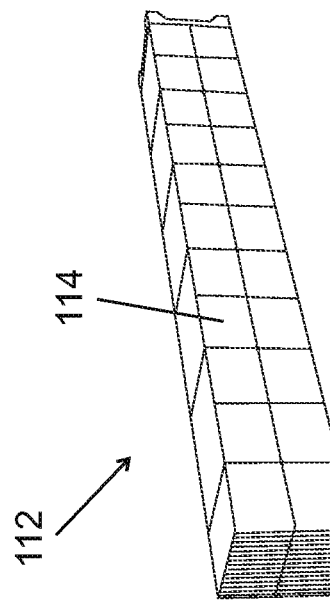
Figure 2Q:
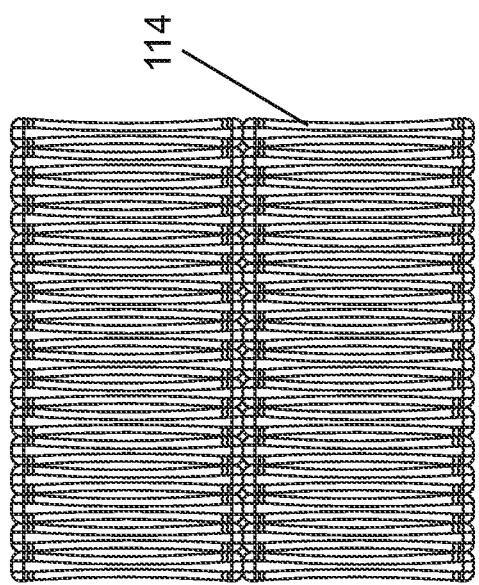
Figure 2Y:
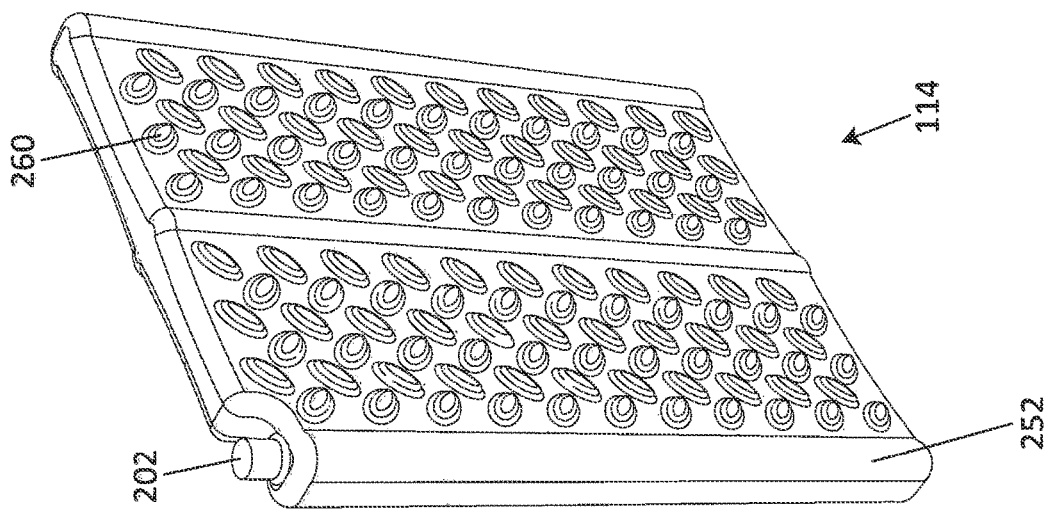

Reference is now made to FIGS. 2A-2Y which are illustrations of ice bricks, ice capsules and thermal storage arrays according to at least some embodiments of the present invention. FIGS. 2A-2D show preferred embodiments of capsules 114. Capsule 114 comprises a filling nozzle 202 placed on an upper corner of capsule 114 to enable filling of capsule 114 to a maximum with second fluid 122 while still enabling efficient packing of capsules 114. Capsules 114 optionally comprise narrow-side spacers 204 and broad-side spacers 206. When provided, spacers 204 and 206 create a gap between capsules 114 when these are packed together inside brick 112. This gap is required to allow flow of first fluid 120 between capsules 114 for freezing of second fluid 122 inside capsules 114. Capsules 114 comprise a high ratio of depth D vs. length L and height H to create a greater surface area around a thinner piece of ice for a more efficient heat transfer of second fluid 122).

FIGS. 2E-2H show preferred embodiments of ice bricks 112 comprising capsule 114. Ice brick 112 comprises a rectangular enclosure 220 for enclosing multiple capsules 114. Capsules 114 are packed together to maximize the amount of second fluid 122 that is contained inside brick 112. Brick is equipped on each end with alignment or support panels 227 for aligning capsules 114 and sealing brick end panels 226 such that brick 112 is watertight when sealed. Brick 112 is connected to array 110 via inlet/outlet pipes 224. Mounting brackets 222 are provided for mounting brick 112 in a fixed position in the array 110 as further described below. Aside from inlet/outlet pipes 224 and interconnecting piping 228 used to connect bricks, brick 112 is completely sealed to fully contain first fluid 120 that flows through brick 112.

Preferably, brick 112 has a size of 50×50×400 cm. Preferably brick 112 has a volume of 1000 L comprising 75% (750 L) of second fluid 122. Preferably brick 112 has an energy storage capacity of 19.8 trh|69 kWh. Alternatively, brick 112 has a size of 25×25×400 cm. The size of brick 112 is selected to provide a balance between sufficient energy storage and construction modularity of the array.

FIGS. 2I-2N show preferred embodiments of bricks 112 in flexible configurations of thermal storage arrays 110. Brick 112 is used as a building block for configuration of an array 110 that is of any desired layout and also capacity. As shown in FIGS. 2I and 2J, bricks 112 are stacked on top of one another, laid end to end and also laid next to one another. Inlet/outlet pipes 224 and interconnecting piping 228 are then used to provide fluid connection between the bricks 112 in the array for first fluid 120. Bricks 112 are fluidly connected in parallel or alternatively in series or alternatively a combination of parallel and series connections.

As shown in FIGS. 2K-2N, once the array 110 has been built with a desired capacity (number of bricks 112), and form (arrangement of bricks 112), insulation panels 230 are attached to the outer surface of the array 110 to fully insulate the array and preserve the thermal storage within the bricks 112. This configuration saves on the total insulation needed as only the outer surface of the complete array 110 needs to be insulated, and not every surface of every brick 112. Array 110 is preferably assembled on top of base frame 232 which is preferably insulated on its underside.

Once array 110 has been arranged into the desired form such as the rectangular box of FIG. 2M or the planar platform of FIG. 2N or any combination of these to create any structural arrangement required for the specific installation, this form can be integrated into the structure served by the thermal storage system 100. As a non-limiting example, the platform of FIG. 2N could function as a floor or could be erected vertically to function as a wall or could function as both floor and wall or could function as a raised platform inside, next to, or on the building/structure serviced by the TES system 100.

FIGS. 2O-2R show additional preferred embodiments of ice bricks 112 comprising capsules 114, wherein capsules 114 are narrower in a middle section thus creating gaps between capsules 114 for flow of first fluid 120.

FIGS. 2S-2U show additional preferred embodiments of capsules 114, wherein capsules 114 comprise a widened middle with a supporting ridge 250 so that upper part 256 and lower part 254 do not collapse when ice forms inside capsule 114. Ridge 250 and ridges 252 create a gap between capsules 114 when these are packed together inside brick 112. This gap is required to allow flow of first fluid 120 between capsules 114 for freezing of second fluid 122 inside capsules 114. Capsules 114 also comprise protrusions 260. Protrusions 260 increase the Reynolds number for first fluid 120 outside capsules 114 thus resulting in a more turbulent flow of first fluid 120 and therefore better distribution of ice formation inside capsule 114.

Figure 2X:
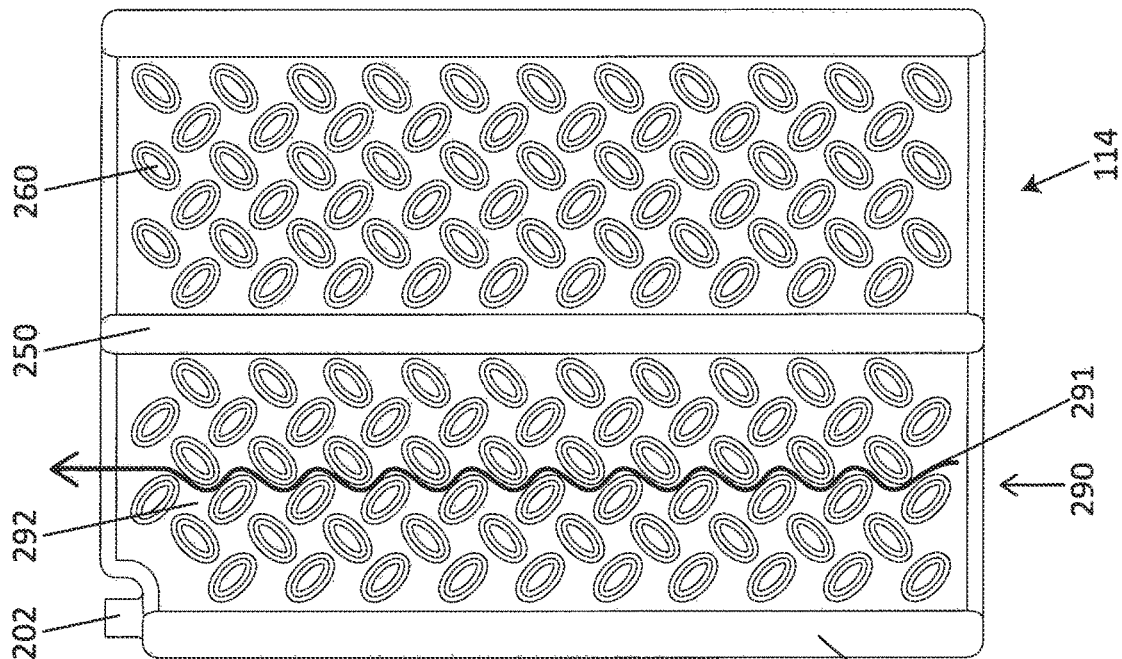
Figures 2V, 2W:
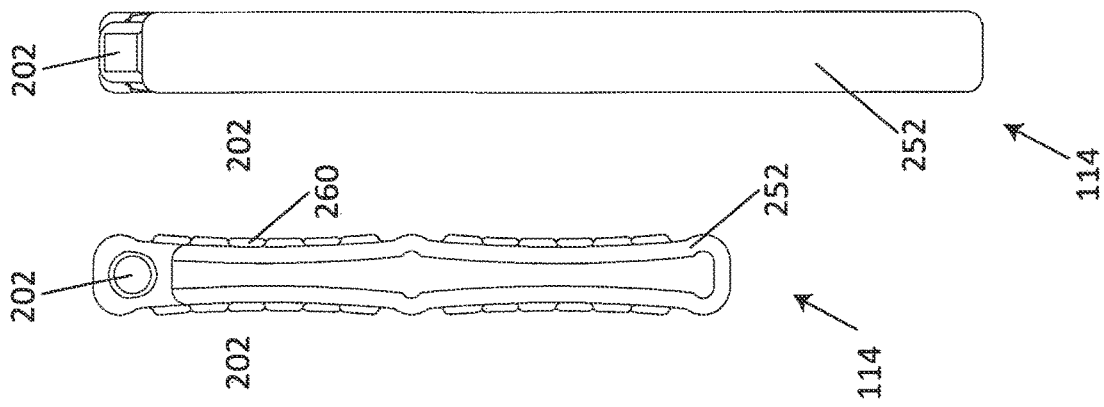

FIG. 2V shows a side view of a capsule 114 with protrusions 260, a ridge 252 and a filing nozzle 202. The filling nozzle is placed such that it does not increase beyond the general outer shape of the rectangular shaped capsule 114. FIG. 2W shows the capsule of FIG. 2V in another side view, perpendicular to the view of FIG. 2V. FIG. 2X shows the capsule of FIGS. 2V and 2W in a front view, wherein the broad-side of the capsule 114 and the general flow direction 290 of the first fluid 120 is shown. The capsule 114 has protrusions 260 that are arranged such that the flow path of the first fluid 260, which passes by the capsule 114, is provided in a meander pattern 291 (or a serpentine pattern). A meander pattern 291 in the sense of the invention is characterized in that the direction of the flow is repeatedly changed. Preferably, the meander pattern 291 is characterized in that the direction of the flow is regularly changed. Even more preferred is that the meander pattern is approximately symmetrical around a center line at least in a part of the meander pattern. The reference numeral 292 refer to flat areas of the capsules 114 between the protrusions 260. FIG. 2Y shows a perspective view of the capsule 114, which is shown in FIGS. 2V, 2W and 2X.

Figure 3:
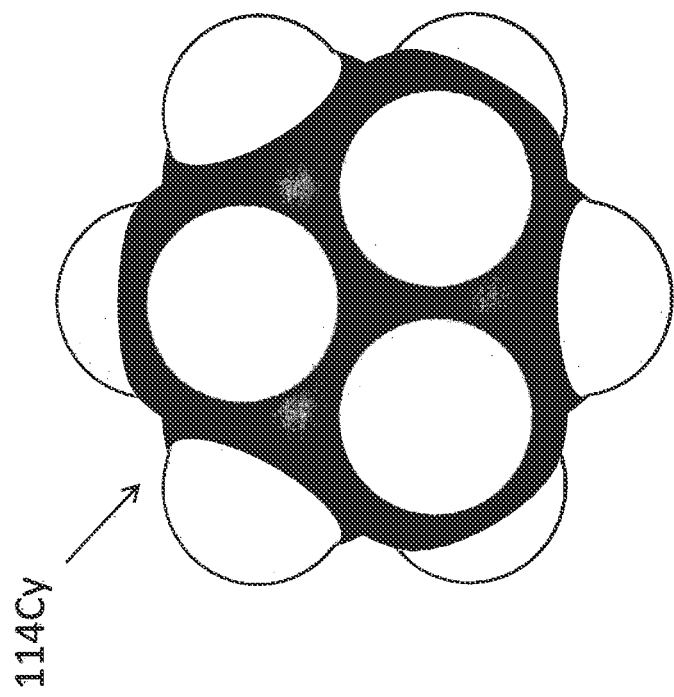
FIG. 3 shows an ice capsule according to at least some embodiments of the present invention.

Reference is now made to FIG. 3 which shows an ice capsule according to at least some embodiments of the present invention. As shown in FIG. 3, capsule 114Cy is preferably provided in a cyclohexane shape. In use, multiple cyclohexane shaped capsules 114Cy are placed inside brick 112 to freely settle inside brick 112. Thus capsules 114Cy are not fixed inside brick 112. The irregular shape of cyclohexane shaped capsules 114Cy enables a high packing factor within brick 112 while allowing gaps for flow of first fluid 120 around capsules 114Cy for freezing the second fluid 122 inside them. Moreover, also a plurality of cyclohexane-shaped capsules 114Cy provides defined flow paths inside the brick 112C, since such defined cyclohexane-shaped capsules 114C will create a defined geometric pattern of these capsules 114c when placing a plurality of them inside an enclosed volume.

Figure 4:
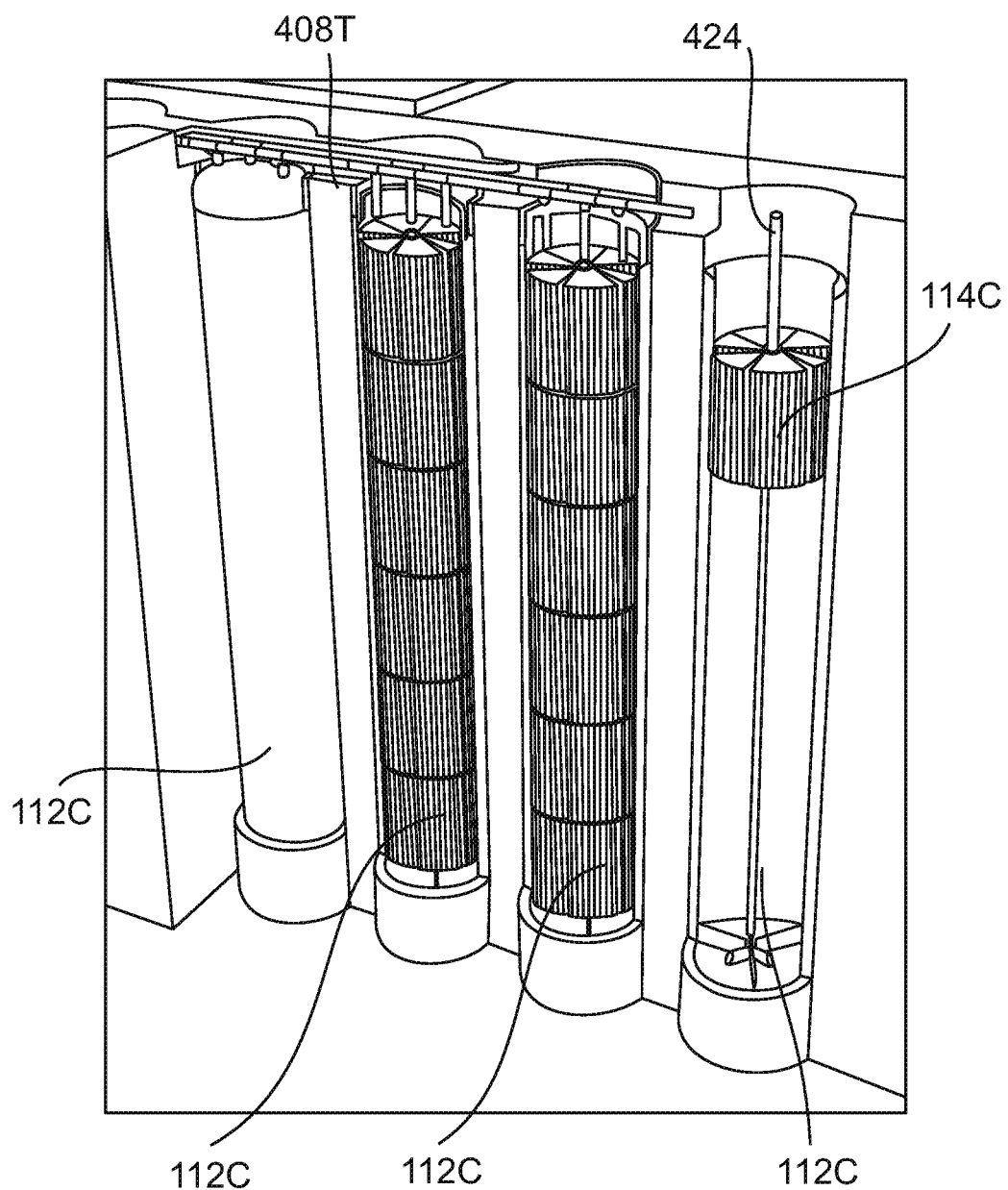
FIG. 4 shows a cylindrical ice brick according to at least some embodiments of the present invention.

Reference is now made to FIG. 4 which shows a cylindrical Ice brick according to at least some embodiments of the present invention. In the optional embodiment as shown in FIG. 4, ice brick 112C is cylindrical and comprises capsules 114C arranged in one or more arrays. Optionally there are multiple arrays placed at different heights within brick 112C. Preferably the cylindrical brick 112C is adapted to be positioned underground. Brick 112C is manufactured from a pipe comprising a spiral metal reinforcement (not shown) than runs along the outside of brick 112C to enable placement of brick 112C underground. The volume of ice brick 112C is preferably between 100-10,000 cubic meters.

Figure 5A:
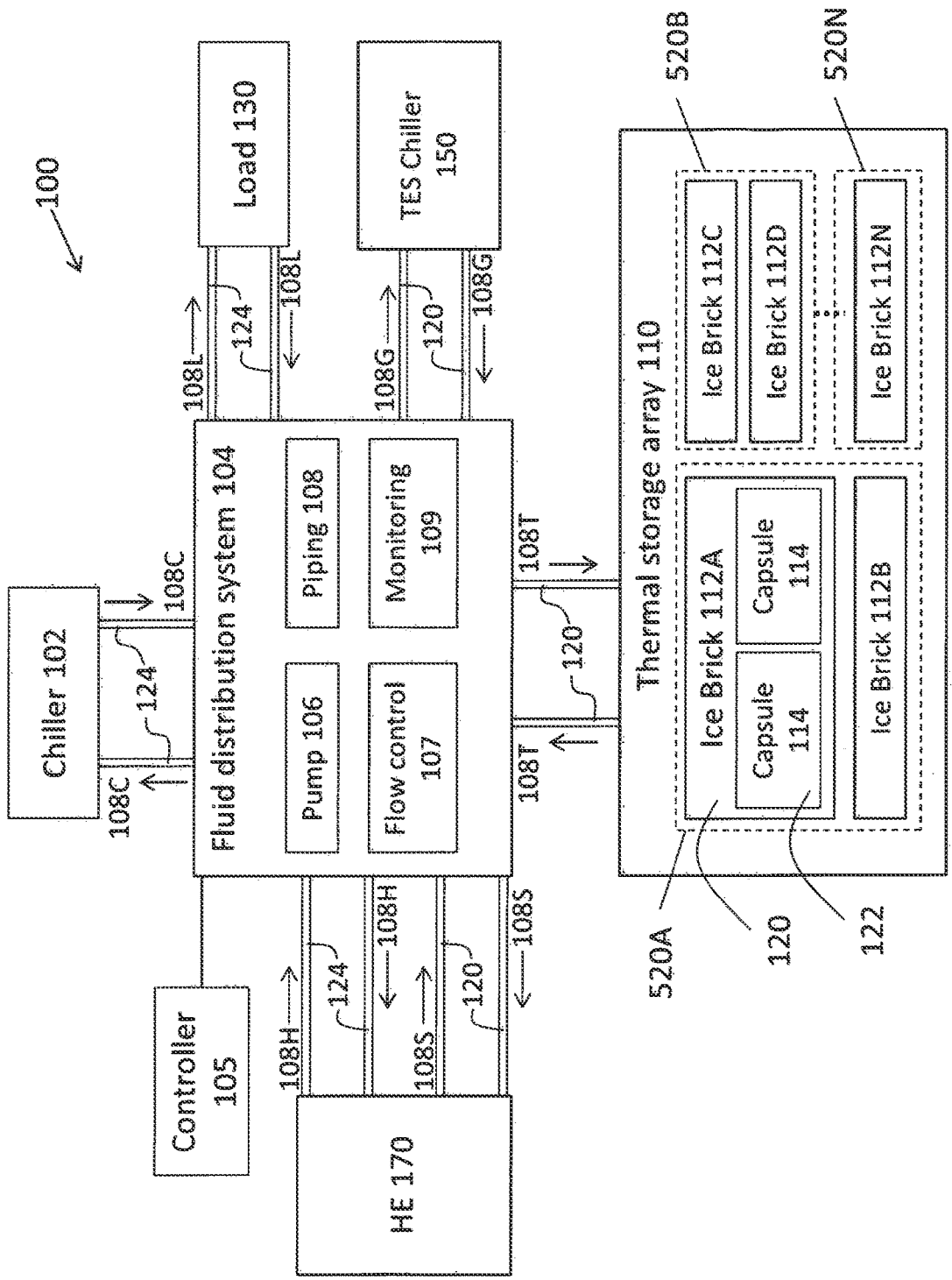
FIG. 5A shows a TES system capable of activating separate subsets of ice bricks by a controller.
Figure 5B:
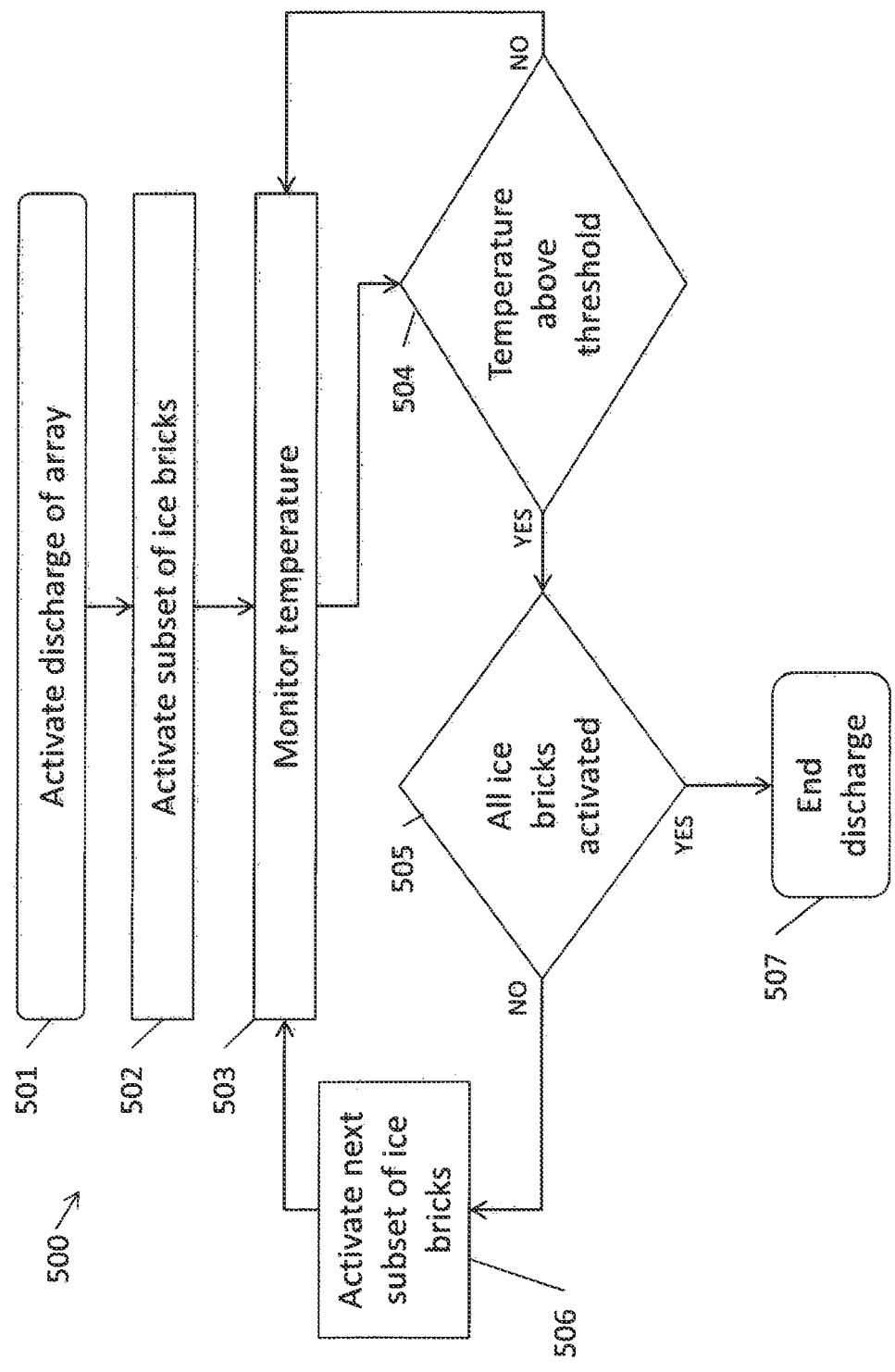
FIG. 5B shows a flow diagram for operation of a TES system.
Figure 5C:
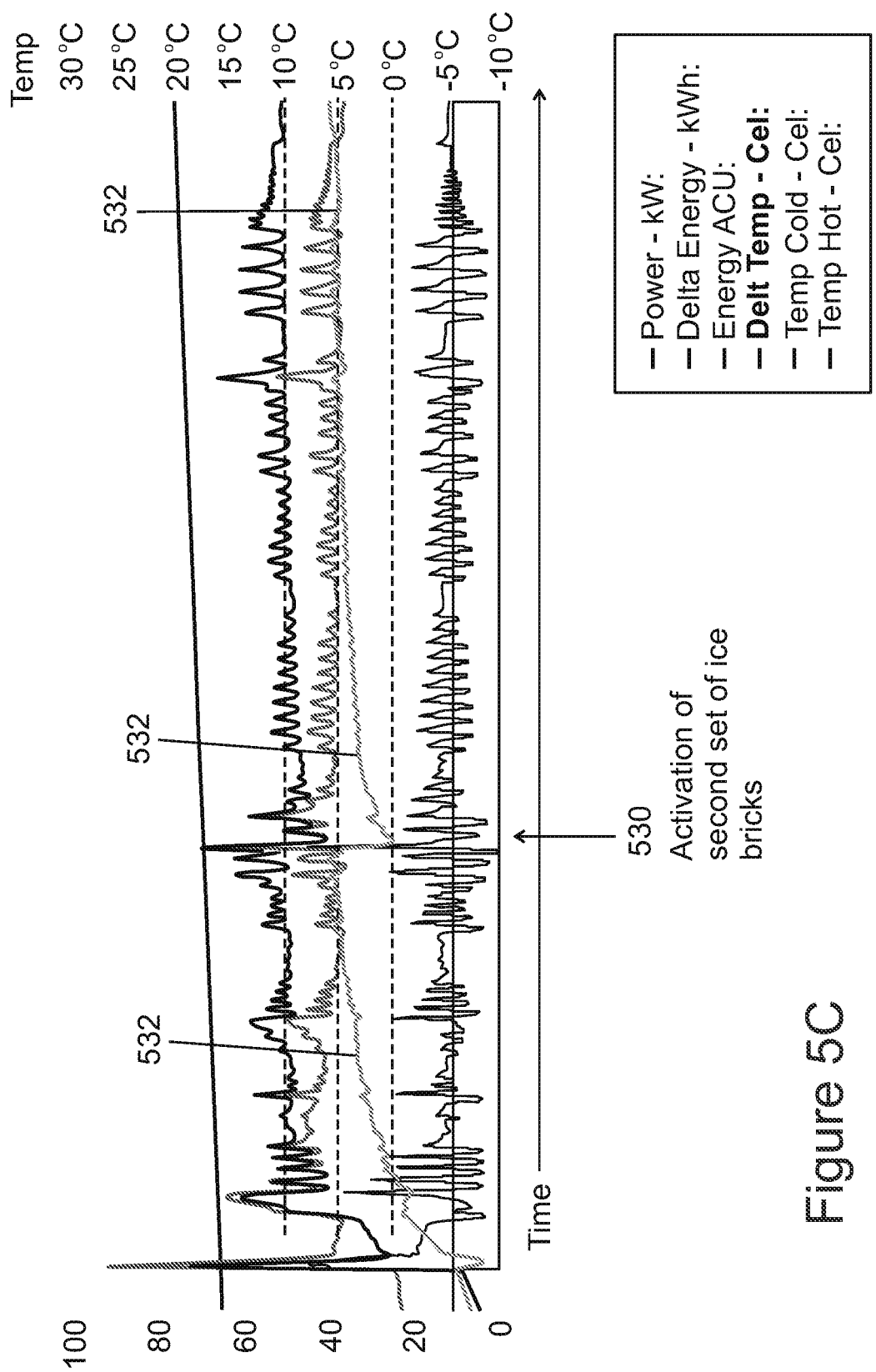
FIG. 5C shows experimental data from operation of a TES system according to at least some embodiments of the present invention.

Reference is now made to FIG. 5A which shows a TES system capable of activating separate subsets of ice bricks by a controller, FIG. 5B which shows a flow diagram for operation of a TES system, and FIG. 5C which shows experimental data from operation of a TES system according to at least some embodiments of the present invention. As shown in FIG. 5A, TES system 100 is structured and operates as per TES system 100 of FIG. 1A. Optionally any of the embodiments of FIGS. 1A-1E may be used as described with reference to FIG. 5B. In the embodiment of FIG. 5A, system 100 comprises N ice bricks 112 where N is an integer greater than 2. It should be appreciated that, as described above, array 110 preferably comprises as many ice bricks 112 as are needed to provide sufficient thermal energy storage. Ice bricks 112 are interconnected using inlet/outlet pipes 224 and interconnecting piping 228 and further are interconnected using components of fluid distribution system 104. Flow control 107 of fluid distribution system 104 enables segmentation of array 110 into subsets 520 of ice bricks 112 that can be activated individually as described below.

As above first fluid 120 flows through ice bricks 112 for charging and discharging. In the discharging process 500 of FIG. 5B, in step 501, the discharging process is initiated. The steps of process 500 are preferably controlled by controller 105 that controls the components of system 100 as described above. Activation of the discharging process may involve several steps such as but not limited to activating pumps 106, opening or closing valves in flow control 107, and monitoring temperatures and flow rates of fluids 120, 122, and 124 using monitoring 109.

In step 502 as part of the activation process, controller 105 activates a first subset 520A of ice bricks 112 and first fluid 120 is pumped only through this first subset 520A and not through any other ice bricks 112. As shown in FIG. 5A first subset 520A includes ice bricks 112A and 112B, however any number of ice bricks 112, and even a single ice brick 112, may be included in a subset and the example of two ice bricks 112 in a subset 520 should not be considered limiting. Optionally more than one subset 520 is activated in step 502. As first fluid 120 passes through first subset 520A, first fluid 120 is cooled while second fluid 122 is warmed. In step 503, the temperature of first fluid 120 is monitored such as by monitoring 109 as it exits array 110. Optionally temperatures of other fluids in system 100 are also measured in step 503.

In decision step 504, monitoring 109 indicates whether the monitored temperature has risen above a defined threshold. If the monitored temperature does not exceed the threshold then no action is taken by controller 105 and step 503 of monitoring is continued. When monitoring 109 indicates that the temperature has risen above the defined threshold (which is preferably defined in controller 105) the implication is that second fluid 122 passing through subset 520A is no longer being sufficiently cooled by subset 520A since second fluid 122 of subset 520A has risen in temperature. In a non-limiting example, where the temperature of first fluid 120 has risen above 5 degrees Celsius at the outlet of array 110, subset 520A is no longer sufficiently cooling first fluid 120.

In decision step 505 controller 105 checks whether all subsets of ice bricks 112 have been activated. When it is determined that not all subsets of ice bricks 112 have been activated, controller 105 activates a next subset 520B of ice bricks 112 in step 506. As above while FIG. 5A shows subset 520B including only ice bricks 112C and 112D, this should not be considered limiting and subset 520B could comprise any number of ice bricks 112. Subset 520B is preferably activated in addition to subset 520. Alternatively subset 520 is deactivated when subset 520B is activated. Optionally more than one subset is activated in step 506. The activation of subset 520B results in a decreased temperature as monitored by monitoring 109 in step 503.

Steps 503, 504 and 505 are repeated as shown in FIG. 5B until it is determined in step 505 that all available subsets, up to subset 520N, of ice bricks 112 have been utilized and in step 507 the discharge process 500 is stopped.

FIG. 5C shows experimental data from operation of a TES system. As shown in the graph of FIG. 5C, the temperature of first fluid 120 is monitored at the outlet of array 110 and plotted as line 532 as a function of time elapsed since activation of a discharging process. In the experimental system, three ice bricks 112 were activated at time=0 and as shown, the temperature increased from −5 degrees Celsius to around 5 degrees Celsius at the time indicated at point 530. At time 530, another ice brick was activated in addition to the initial three ice bricks and this immediately lowered the outlet temperature as in graph 532 to around 0 degrees Celsius. The temperature then gradually rose once more to around 5 degrees Celsius as the fourth ice brick also discharged. As can be seen from the experimental graph 532, the gradual activation of ice bricks 112 or subsets of ice bricks 520 results in more balanced discharging of TES system 100, longer discharging time resulting in longer periods of TES cooling of a load 130, and better utilization of each ice brick 112 which is more fully discharged.

Reference is now made to FIGS. 6A-6G which show spacers for use in an ice brick according to at least some embodiments of the present invention. Spacers 600 and 620 are inserted between capsules 114 inside ice bricks 112. An ice brick 112 preferably comprises multiple spacers 600 or alternatively spacers 620. Alternatively an ice brick 112 comprise a combination of spacers 600 and 620.

Figure 6A:
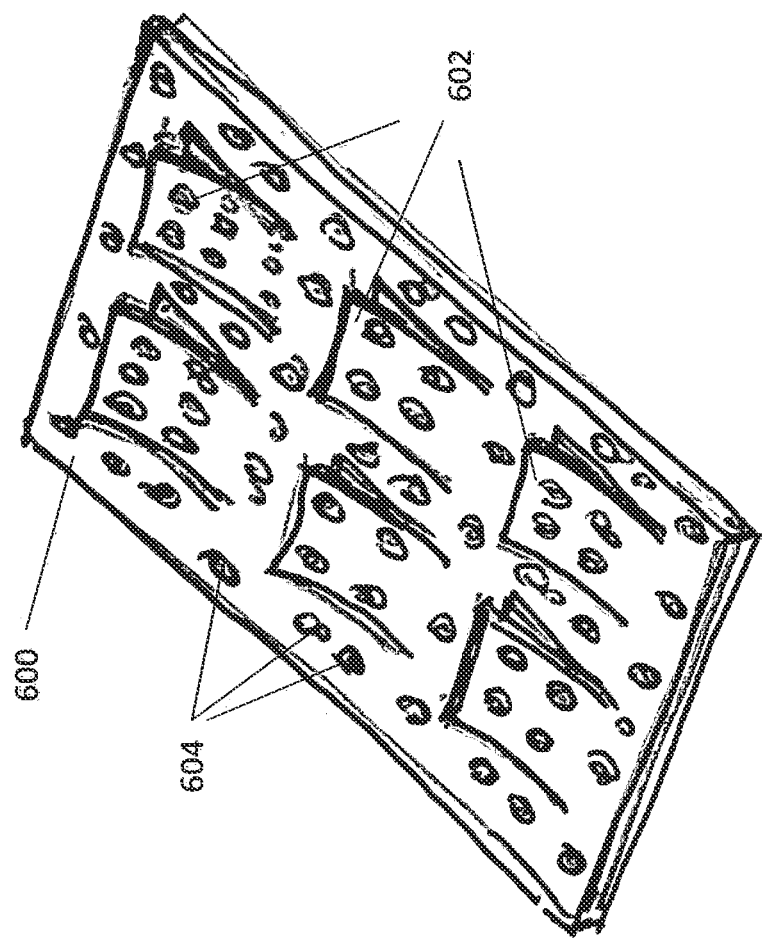
FIGS. 6A-6G show spacers for use in an ice brick according to at least some embodiments of the present invention.
Figure 6C:
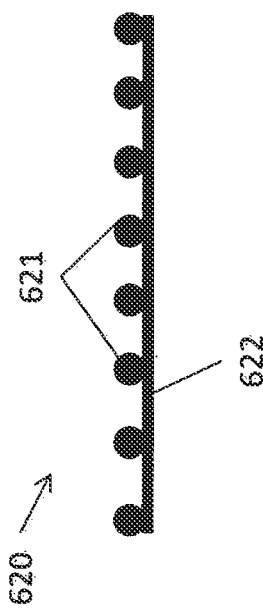
Figure 6B:
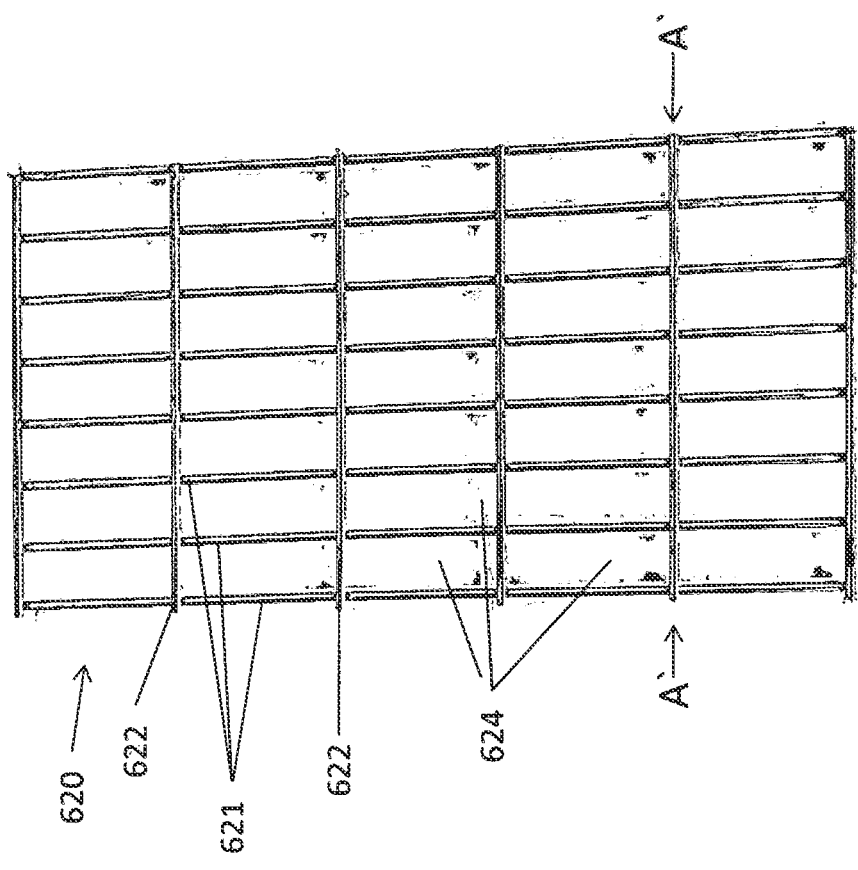
Figure 6E:
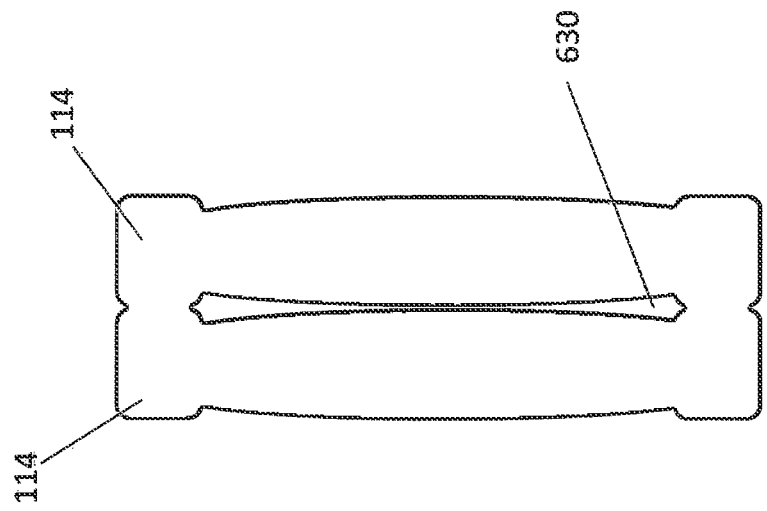
Figure 6D:
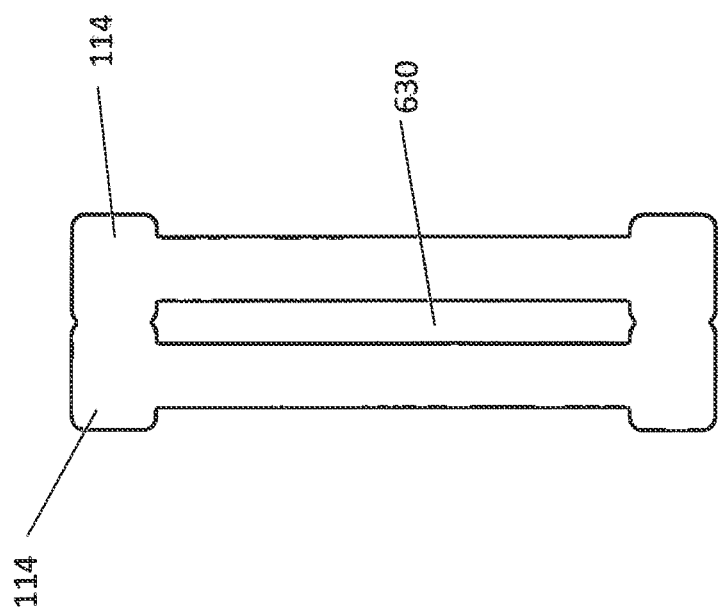
Figure 6G:
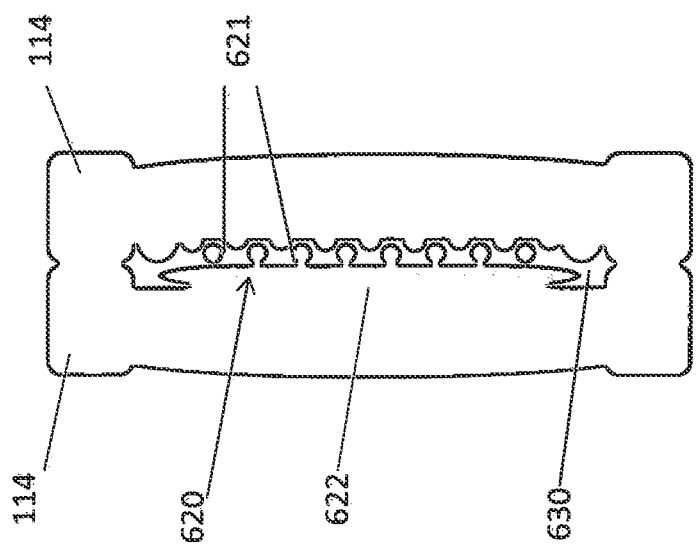
Figure 6F:
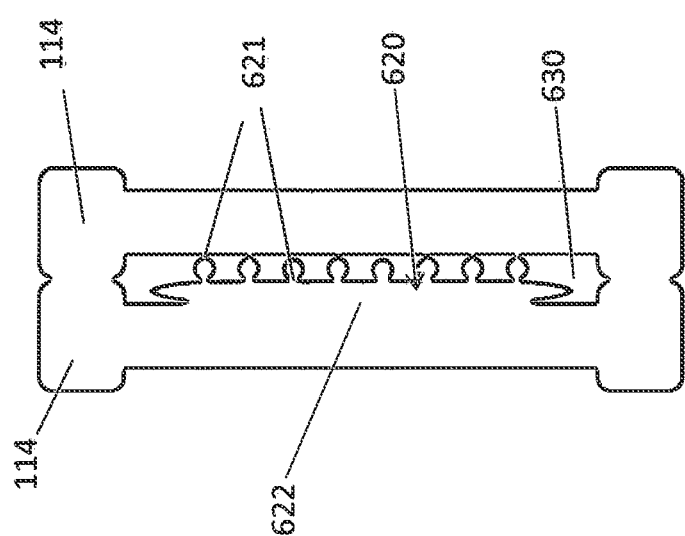

FIGS. 6D and 6E show two capsules 114 without any spacer 600 or 620 in a discharged (FIG. 6D) and charged (FIG. 6E) state. FIGS. 6F and 6G show two capsules 114 with spacer 620 in a discharged (FIG. 6F) and charged (FIG. 6G) state. Two capsules 114 are shown for purposes of simplicity and it should be apparent that any number of capsules and spacers may be provided as required inside brick 112. The purpose of spacers 600 and 620 is to maintain a minimum flow area 630 around capsules 114. Flow area 630 is required since capsules 114 expand (FIG. 6E) when capsules 114 are fully charged (second fluid 122 such as water has changed into ice). This expansion by capsules 114 can block the flow of first fluid 120 by constricting flow area 630 (FIG. 6E) preventing first fluid 120 from passing through ice brick and 112 and thereby preventing efficiently cooling of first fluid 120. Further, when second fluid 122 (such as water) is in a discharged state (FIG. 6D) capsules 114 shrink and the flow area 630 between capsules 114 grows causing a significant decrease in first fluid flow velocity which effects heat transfer for both charging and discharging.

In the embodiment of FIG. 6A spacer 600 ensures a sufficient flow area 630 by fitting between capsules 114 such that capsules 114 cannot expand to fill the flow area. Holes 604 in spacer 600 allow for flow of first fluid 120. When capsules 114 discharge, flexible flaps 602 open away from spacer 600 in order to occupy flow area 630 and thereby increase first fluid flow velocity.

In the embodiment of FIGS. 6B, 6C, 6F and 6G, spacer 620 ensures a sufficient flow area 630 by fitting between capsules 114 such that capsules 114 cannot expand while freezing to fill flow area 630. FIG. 6C shows cross section A'-A' of spacer 620. Gaps 624 between the vertical bars 621 and horizontal bars 622 in spacer 620 allow for flow of first fluid 120. As shown in FIG. 6F spacer 620 fits between capsules 114 and vertical bars 621 and horizontal bars 622 increase the flow velocity of first fluid through flow area 630. As shown in FIG. 6G, when capsules 114 are charged and expand, spacer 620 prevent capsule 114 from blocking flow area 630 thus ensuring continued flow of first fluid 120 around capsules 114.

Reference is now made to FIGS. 7A to 7D, which show an ice brick 112, i.e., a thermal energy storage unit 711.

Figure 7A:
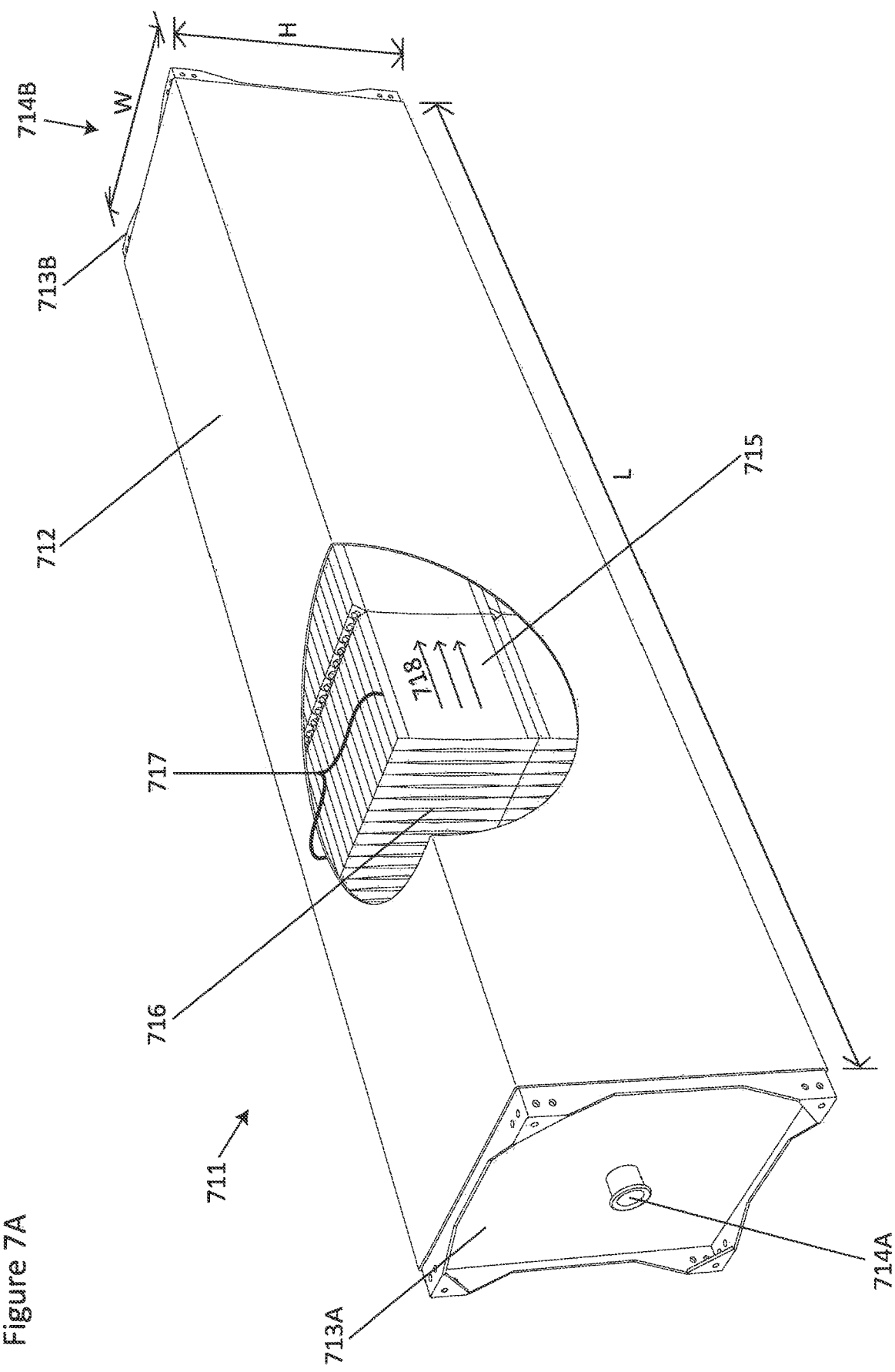
FIGS. 7A to 7D show a thermal energy storage unit and cross-sectional views of a thermal energy storage unit including the tube and capsules.

The thermal energy storage unit 711 of FIG. 7A comprises a tube 712, which has the shape of an elongated, hollow body. The tube 712 is preferably made of metal, e.g., carbon steel or stainless steel. A front end element 713A and a back end element 713B are arranged to close the tube at both ends such that a rectangular-shaped enclosure is provided. Both elements 713A and 713B are also preferably made of metal, e.g., stainless steel or carbon steel and provide means for mounting the thermal energy storage unit 711 e.g. to supporting means (not shown). The front end element 713A and the back end element 713B have an inlet 714A and an outlet 714B, respectively. The inlet 714A and the outlet 714B can be connected to further thermal energy storage units 112, the piping 10 and/or to the fluid distribution system 104. Inside the tube 712, a plurality of capsules 715 is arranged. The capsules 115 have the shape of plates or bricks. Furthermore, the capsules 715 have a concave or recessed shape of their main surfaces (i.e. of their broad-sides). The arrangement of the capsules 715 inside the tube is preferably configured by a plurality of horizontally arranged stacks 717 of capsules 715 (i.e., the stacks are stacked in a width direction of the tube 712). For example, 16 or 8 capsules 715 can form one stack 717 of capsules 715. A plurality of stacks 717 is arranged one after another along the length of the tube 712. The capsules contain a phase-change material as second fluid 122 such as water, and preferable a nucleation agent, such as quartz. Between the capsules 715, as well as between the capsules and the tube 712, a space 716 is provided, in which the first fluid 120, e.g., a water/glycol mixture, can flow inside the tube 712 from inlet 714A to outlet 714B.

This arrangement allows an efficient exchange of heat between the first fluid 120 and the second fluid 122 via the wall of the capsule 715. The actual heat exchange rate between the capsule 715 and the first fluid 120 is dependent on several factors including the speed of the flow, the effective area of the contact surface between the flow of the first fluid 120 and the capsule 715, and the type of the flow (e.g., turbulent or laminar). The embodiment of FIG. 7A improves all of these factors. This is explained in more detail below:

The elongated shape of the tube in combination with the stacked arrangement of the capsules 715 defines residual free spaces 716, which result in a plurality of predefined flow paths 718 of the first fluid next to the capsules. The overall flow of the first fluid 120 at the inlet 714A is divided into the plurality of predefined flow paths 718, wherein each of the flow paths 718 passes by a plurality of capsules along the length of the tube 712. Moreover, the capsules 715 are configured such that the flow paths 718 are defined in a frozen (expanded) state of the capsules 715 as well as in a non-frozen (non-expanded) state of the capsules 715. In other words, a plurality of predefined or fixed flow channels for the first fluid 120 is provided between the capsules 715 while considering the changing volume of the capsules due to the volume change of the second fluid, especially while changing phase. Consequently and in contrast to conventional tank-based thermal energy storage units, a predefined system of a plurality of flow paths 718 for the first fluid 120 for exchanging heat is provided. The flow of the heat transfer fluid in conventional tank based thermal energy storage units has a high degree of randomness, wherein for example it is hard for the first fluid to reach edges of the tank.

Moreover, the plate shape of the capsules 715 geometrically increases the surface of the capsules 715 (i.e., its surface-to-volume ratio), wherein the largest surfaces (i.e. the broad-sides) of the capsules 715 advantageously define its main surfaces for exchanging heat.

Correspondingly, each flow path 715 of FIG. 7A has a narrow shape that is aligned parallel to said main surfaces of the capsules 715. The narrow shape of defined flow paths 718 utilizes the main surfaces of the capsules 715 such that the heat transfer rate is increased. In other words, the above explained arrangement of the thermal energy storage unit 711 significantly increases the effective area of the contact surface for exchanging heat while keeping the pressure drop at an acceptable level (e.g., below 1 bar).

The elongated shape of the tube 712 provides defined flow paths of the first fluid 120 that are significantly longer than with conventional systems. Hence, the exchange of heat of the first fluid 120 with the plurality of stacks 717 is optimized, since a gradual activation of the stacks 717 while frosting or defrosting the capsules 715 takes place.

Additionally, the average length of the flow paths is increased to be longer than the length L of the tube 712. This additionally increases the heat transfer rate.

Figure 7D:
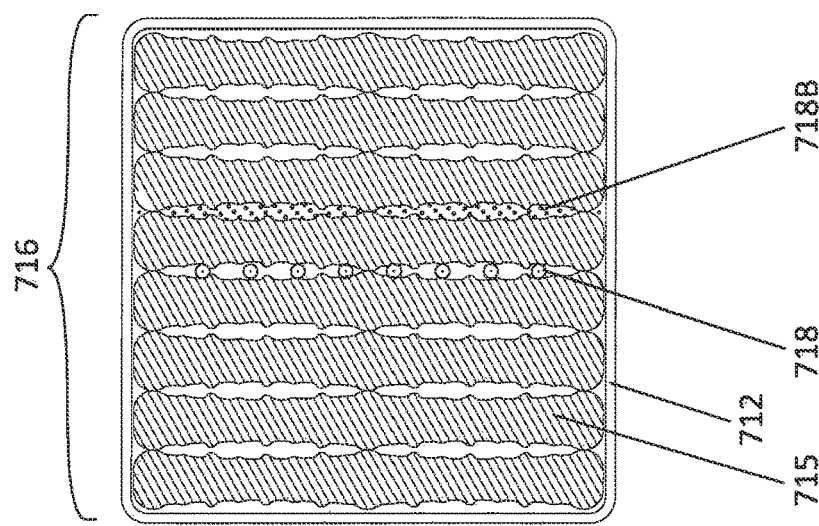
Figure 7C:
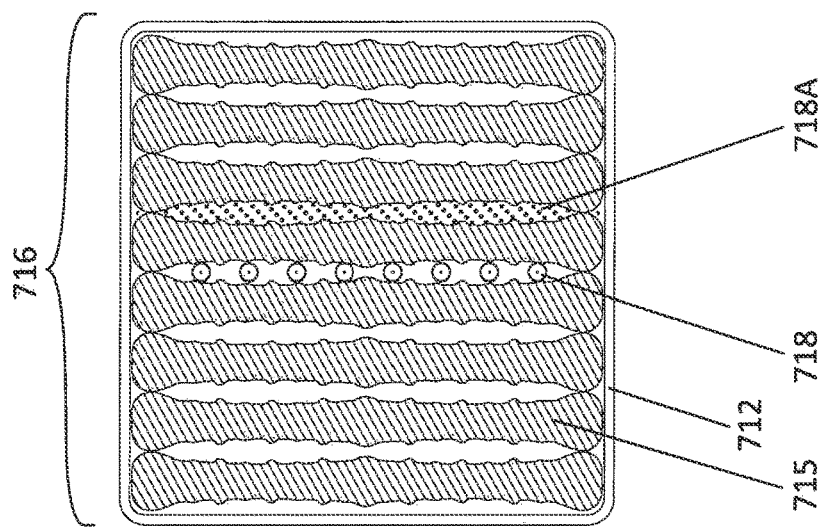
Figure 7B:
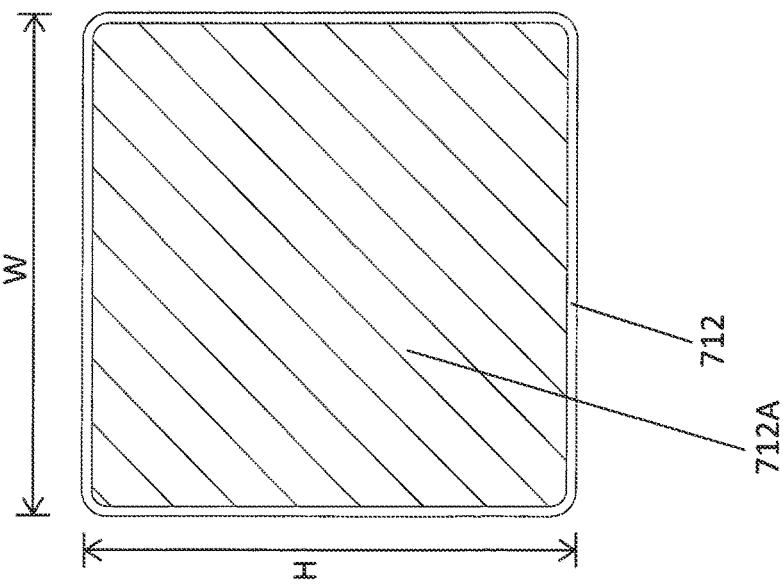

FIG. 7B shows a cross-section of an empty tube 712. FIG. 7C shows a cross-section of a tube 712 including a stack 717 of capsules 715 with water in a liquid (non-frozen) state. Hence, the thermal energy storage unit 711 of FIG. 7C is fully discharged. FIG. 7D shows a cross-section of a tube 712 including a stack 717 of capsules 715 with water in a frozen/solid state. Hence, the thermal energy storage unit 711 of FIG. 7D is fully charged. The tube 712 of FIG. 7B has ideally an overall cross-section (i.e. cross-sectional area) of the tube 712A for the first fluid 120, if considered without any capsule 715. If a stack 717 of capsules 715 is placed inside the tube 712, narrow-shaped flow paths are provided between capsules 715; in FIG. 7C one of these narrow flow paths 718 is indicated by a plurality of circles, which indicate the flow direction of the first fluid 120. The flow paths 718 are provided in a cross-sectional area between each of two capsules 120 (one of these free-flow cross-sectional areas for the flow paths is indicated with the reference numeral 718A in FIG. 7C) for the first fluid 120 and, at the left and right side of FIG. 7C, between the wall of the tube 120 and the outmost left and right capsule 715, respectively. One of these cross-sectional areas that define the flow paths 718 is indicated with the reference numeral 718A in FIG. 7C. FIG. 7D shows almost the same configuration as FIG. 7C with the key difference that the residual cross-sectional areas for the flow of the first fluid 120 between the capsules 715 are smaller, since the capsules 715 are expanded by the frozen second fluid 122 inside them. One of these free-flow cross-sectional areas that define the flow paths 718 for the first fluid 120 is indicated in FIG. 7D by the reference numeral 718B. The plurality of stacks 717 is arranged such that continuous flow paths 718 are provided along the length of the tube in general from the front end to the back end to the tube. The average length of these flow paths 718 is longer than the length of the tube 712 itself. Preferably, the stacks 717 of the capsules 715 have the same number of capsules 715. Preferably, the stacks 717 are consecutively arranged next to each other such that the flow paths 718 are provided by the plurality of stacks 717 itself.

Since water expands its volume while charging/freezing, the capsules 715 of FIG. 7C require more space than the capsules of FIG. 7B. This effect is also called "breathing-effect" of the capsules 715. Due to this breathing effect, the residual space for the first fluid 120 changes according to the state of the second fluid 122 inside the capsules 715. The breathing-effect of the capsules 715 has to be considered while defining the flow paths 718. First, the stacks 717 have to be adapted such that the flow paths 718 are not blocked in the charged and in the discharged state. Second, the stacks 717 have to be adapted such that the flow paths 718 provide an acceptable pressure drop in the case of frozen capsules 715 as well as in the case of non-frozen capsules 715. Third, the overall thermodynamic configuration of the thermal energy storage unit 711 has to be optimized. This includes especially the flow dynamics of the first fluid 120 in the flow path 718 that should be configured such that an efficient heat transfer between the capsules 715 and the first fluid 120 can take place.

The first item mentioned above is for ensuring that a flow of the first fluid 120 can be provided at all times.

The second item mentioned above is explained more in detail as follows. The longer the flow path and smaller the flow path's cross-sectional area, the greater is the increase of the pressure drop. An increased pressure drop has the disadvantage of a higher pumping power consumption (i.e., higher system losses and less total efficiency of the system) and the disadvantage of increasing mechanical requirements for the whole system. Consequently, the pressure drop from inlet 714A to outlet 714B has to be below 1 bar (atmosphere). Preferably, thermal energy storage unit is configured such that the pressure drop is less than 0.5 bar in its fully-charged as well as in its fully-discharged state.

With respect to the third item mentioned above, a ratio of a combined length of a plurality of tubes (or one very long tube) to a flow-cut-area is in a range of about 40 to 200, preferably of about 60 and 150. These ratios of a flow-cut-area to a combined length of a plurality of tubes (i.e., the total length of several tubes 712 connected together in series) provide an efficient heat transfer rate with an acceptable pressure drop.

This allows on one hand more time for the capsules placed closest to the inlet (which suffer from reduced heat transfer rate due to ice melting inside the capsules) to continue their heat transfer into the first fluid 120 at a lower heat transfer rate and a lower exchange temperature, while the capsules 715 located more downstream of the flow of the first fluid 120 continue their heat transfer at a higher heat transfer rate.

The term "flow-cut-area" is a number which is calculated as follows:

$$\text{Flow-cut-area} = (TCSA - (FFCSA\text{-}LS + FFCSA\text{-}FS)/2 \times CPS)/CPS$$

wherein the above stated variables are defined as follows:
TCSA=overall available cross-sectional area 712A of the tube (see FIG. 7B);
FFCSA-LS=free flow cross-sectional area 718A per capsule in the liquid state of the second fluid (i.e. in a discharged state, see FIG. 7C);
FFCSA-FS=free flow cross-sectional area 718B per capsule in the frozen state of the second fluid (i.e. in a charged state, see FIG. 7D);
CPS=number of capsules 715 per stack 718;

With the above stated formula, an average free flow cross-sectional area (i.e., (FFCSA-LS+FFCSA-FS)/2) per capsule 715 is used to calculate the available total flow area in a tube's cross-section. The result is then used to calculate the average cross-sectional flow area per capsule, i.e., the flow-cut-area.

The calculated flow-cut-area can be used to calculate a ratio gamma that is a good indicator for the efficiency of the heat transfer between capsule and first fluid as follows:

$$\text{Ratio gamma} = \text{combined length of the plurality of tubes/flow-cut-area}$$

A gamma ratio of the combined length of the plurality of tubes to the said flow-cut-area of approximately 150 is an optimal value. A system which has been configured according to the above explained requirement demonstrated a yield value (a percentage of second fluid melted during a 4 hours period discharge rate) higher than 80% with an acceptable exit temperature of the first fluid below 5 degrees Celsius and an acceptable pressure drop (~0.5 bar). Increasing the ratio to 200 (with a shape of the capsule according to the above explained embodiments) will increase the pressure drop beyond the desired limit. Decreasing the ratio below 40 will decrease the yield percentage while discharging to 50%. A ratio in the range of 60 to 90 will also result in a reasonable efficiency of the unit 711. Moreover, the embodiment provides, in contrast to conventional "encapsulated ice" systems, a flat and stable discharge curve (behavior)

It is to be noted that the above stated rages and optimal values for the ratio gamma are the result of theoretical and practical experiments with the above embodiments.

Figure 8A:
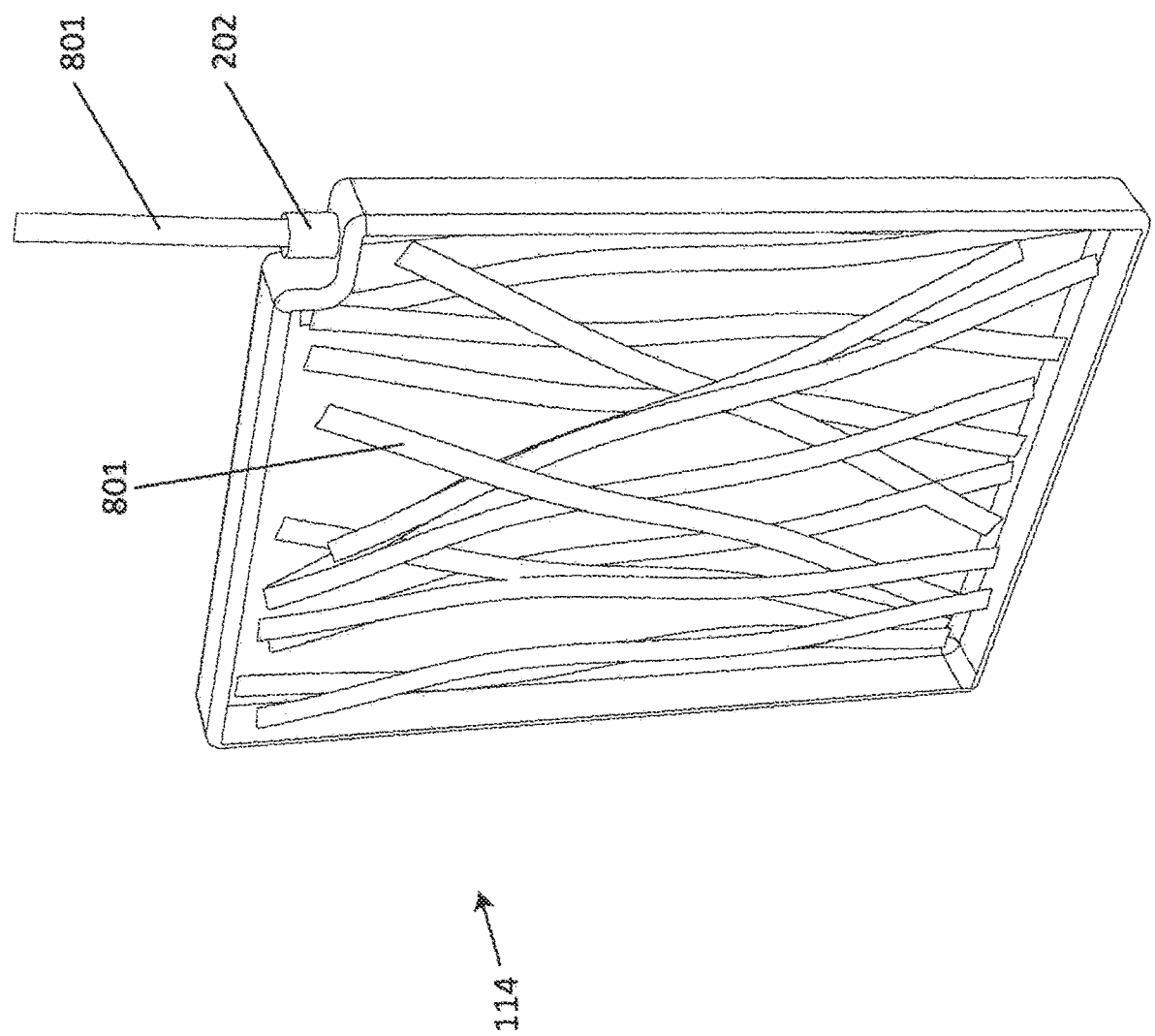
FIGS. 8A and 8B show capsules containing metal strips.

FIG. 8A shows a capsule 114 with a filling nozzle 202 that has a predefined diameter. Flat metal strips 801 are provided such that they are arranged inside the capsule 114. The width of the strips is adapted to the diameter of the filling nozzle 202 such that the strips can be inserted into the capsule 114. It is to be noted that the strip 801 that is placed in the filling nozzle 202 in FIG. 8A is only shown for demonstration purposes. The capsule 114 as finally used for the heat storage unit is only provided with strips 801 that are completely located in the interior of the capsule 114. The length of the strips 801 is preferable dimensioned such that they fit well inside the length of the capsule 114. In this way, the strips 801 will stay in place in the interior of the capsule 114 and will effect a large part of the internal volume of the capsule 114. Preferably, a plurality of metal strips is used in order to increase the overall heat transfer efficiency of the capsule 114. These strips 801 act as heat transfer elements, which improve the transfer of heat inside the capsule 114 and improve the total heat transfer efficiency of the individual capsule.

Figure 8B:
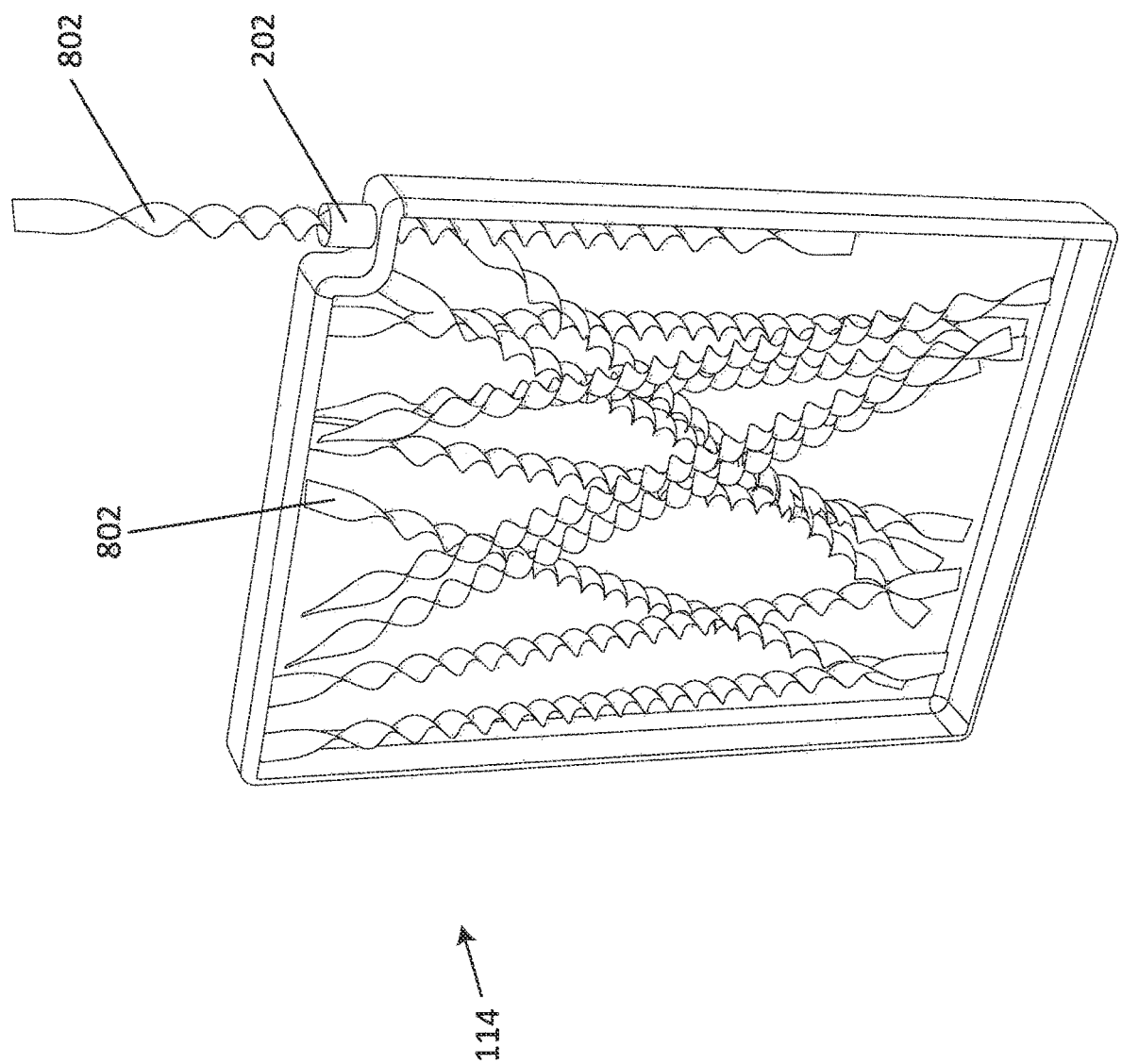

FIG. 8B shows a capsule 114 with a filling nozzle 202 that has a predefined diameter. Helical flat metal strips 802 are provided such that they are arranged inside the capsule 114. The width of strips is adapted to the diameter of the filling nozzle 202 such that the strips can be inserted into the capsule 114. It is to be noted that the strip 802 that is placed in the filling nozzle 202 in FIG. 8A is only shown for demonstration purposes. Helical flat metal strips 802 provide an even better distribution of heat in the interior of the capsule 114.

Figure 9A:
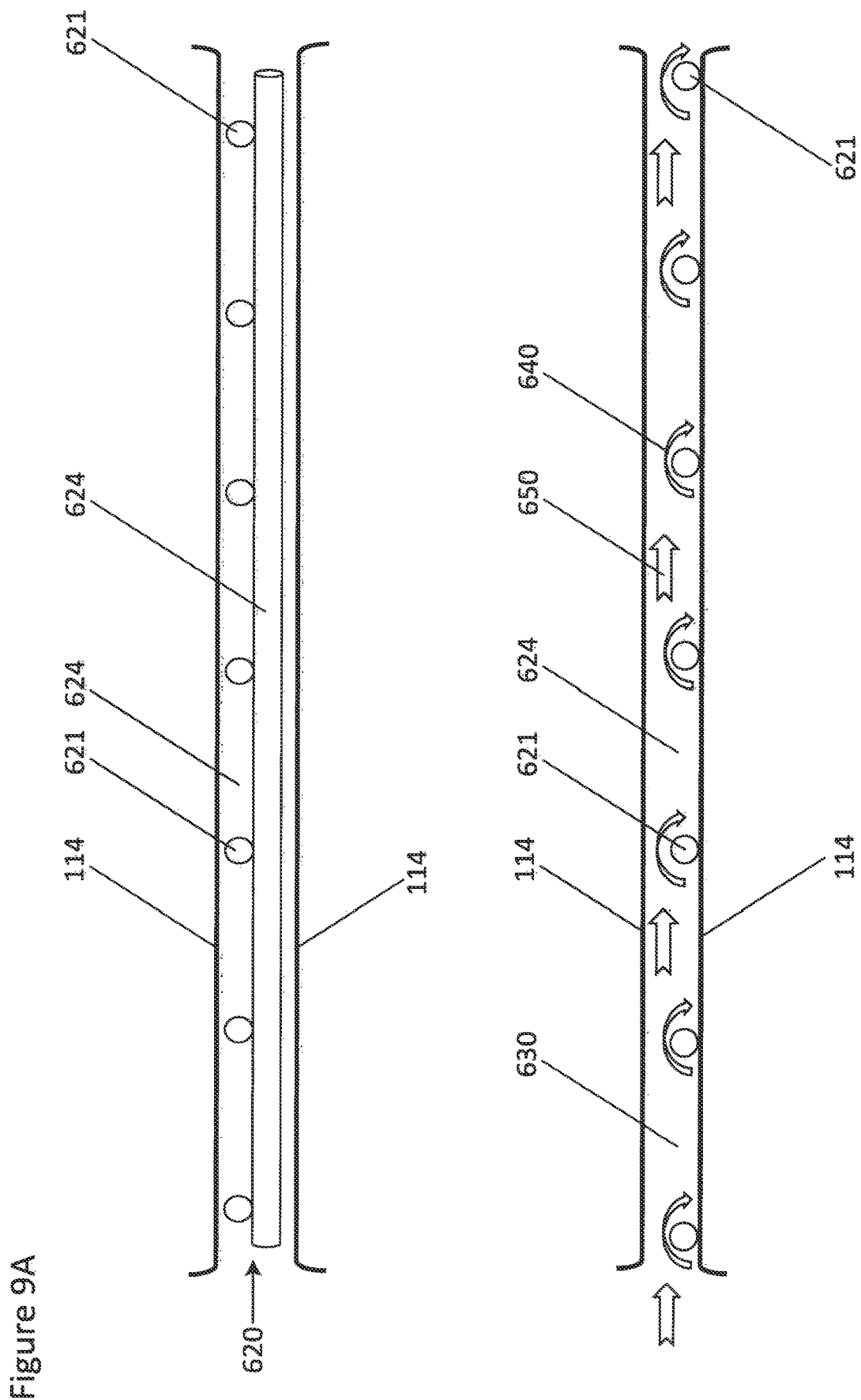

FIG. 9A shows a rigid spacer 620 having vertical bars 621, horizontal bars 622 and gaps 624 between the bars. The rigid spacer 600 is provided between two neighboring capsules 114. Reference is made to FIGS. 6B and 6C and the corresponding explanation. This rigid spacer could, for example, be used in combination with the embodiment described in context with FIGS. 7A-D.

When the capsule's wall deflects towards the neighboring capsule wall while charging (i.e., while freezing of the second fluid 122), the horizontal bars 622 maintain a free flow path near them, which will allow parallel flows 650 of the first fluid 120, which will cause melting of the ice across the whole capsule width. The perpendicular vertical bars will create turbulent flow which will improve the heat transfer coefficient between the wall of the capsule and the flow of the first fluid 120, as depicted by the curved arrows 640.

FIG. 9B shows a flexible spacer 600 having flaps 602. The flexible spacer 600 is provided between two neighboring capsules 114. Reference is made to FIG. 6A and the corresponding explanations. Furthermore, protrusions 603 are provided in order to create a more turbulent flow. This flexible spacer 600 could, for example, be used in combination with the embodiment described in context with FIGS. 7A-D.

The placement of flexible spacers 600 equipped with flaps 602, which are preloaded to press against the neighboring capsule's 114 flat walls, will force the first fluid to flow through the narrow gap between the capsules' 114 walls.

This increases the heat transfer rate of the first fluid 120 with the capsule 114. Additionally the turbulence of the flow is increased. This is depicted by the lines 900 in FIG. 9B. The minimum clearance in the charged stage (i.e., the minimal size of the gap) should be approximately 1 mm on each side.

Furthermore, the flexible spacer 600 can be configured such that the gap will grow (due to ice melting) to approximately 3 to 5 mm on each side. This which will advantageously cause a reduction of the velocity of the fluid flow of the first fluid 120 to one fourth (¼) of its maximum velocity in the tube.

The flaps (wings) which are pre-set to expand away from the straight sheet and to move toward the capsule wall and to maintain narrow flow gap for the first fluid 120 near the capsule 114 and will prevent the degradation of performance as described above.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

List of reference signs

| | |
|---|---|
| energy storage (TES) system | 100 |
| chiller | 102/150 |
| fluid distribution system | 104 |
| controller | 105 |
| pumps | 106 |
| flow control mechanisms | 107 |
| piping | 108 to 108T |
| monitoring components | 109 |
| array | 110 |
| ice bricks | 112, 112B, 112C, 112D |
| ice capsules | 114, 114C, 114Cy |
| first fluid | 120 |
| second fluid | 122 |
| third fluid | 124 |
| air | 126 |
| cooling load | 130 |
| air compressor | 140 |
| Heat exchanger (HE) | 142, 152, 170 |
| filling nozzle | 202 |
| narrow-side spacers | 204 |
| broad-side spacers | 206 |
| rectangular enclosure | 220 |
| Mounting brackets | 222 |
| inlet/outlet pipes | 224 |
| end panels | 226 |
| support panels | 227 |
| interconnecting piping | 228 |
| base frame | 232 |
| ridge | 250, 252 |
| lower part | 254 |

-continued
List of reference signs

| | |
|---|---|
| upper part | 256 |
| protrusions | 260 |
| general flow direction | 290 |
| meander pattern | 291 |
| discharging process | 500 |
| subsets 520, 520A, 520B | 520, 520A, 520B |
| spacers | 600, 620 |
| flaps | 602 |
| protrusions | 603 |
| vertical bars | 621 |
| horizontal bars | 622 |
| gaps | 624 |
| flow area | 630 |
| curved arrows | 640 |
| flows | 650 |
| tube | 712 |
| overall cross-section of the tube | 712A |
| front end element | 713A |
| back end element | 713B |
| inlet | 714A |
| outlet | 714B |
| capsule | 715 |
| spaces | 716 |
| stacks of capsules | 717 |
| flow paths | 718 |
| free flow cross-sectional area in the liquid state of the second fluid | 718A |
| free flow cross-sectional area in the frozen state of the second fluid | 718B |

The invention claimed is:

1. A thermal energy storage system, comprising:
an ice brick having at least one inlet and at least one outlet for a first fluid; and
a plurality of capsules having a second fluid therein, wherein the plurality of capsules is arranged inside the ice brick;
wherein:
the first fluid is a heat transfer fluid for exchanging heat with the second fluid;
the second fluid is a phase-change medium; and
wherein an average length of an actual flow path of the first fluid from a front end of the ice brick to the back end of the ice brick is larger than a length of the ice brick;
the ice brick is shaped as a tube with a rectangular cross section;
a ratio of the length of the ice brick to the width of the ice brick is in a range of 4 to 50; and
a ratio of a width of the ice brick to the height of the ice brick is in a range of 0.5 to 4.

2. The thermal energy storage system of claim 1, wherein a flow path of said first fluid through said ice brick is arranged as a meander path.

3. The thermal energy storage system of claim 1, wherein said ice brick is an elongated ice brick and a cross section of said ice brick is rectangular.

4. The thermal energy storage system of claim 1, wherein:
the shape of the ice brick is rectangular;
a ratio of the length of the ice brick to the width of the ice brick is in a range from 12 to 20; and
a ratio of a width of the ice brick to the height of the ice brick is about 2.

5. The thermal energy storage system of claim 1, wherein a total volume of the second fluid of the plurality of capsules is 50% to 95% of the total volume of the ice brick.

6. The thermal energy storage system of claim 1, wherein said capsule comprises a cyclohexane shape.

7. The thermal energy storage system of claim 1, wherein at least one surface of the capsules comprises protrusions adapted to create or increase a turbulence of the flow of the first fluid though the ice brick.

8. The thermal energy storage system of claim 1, further comprising rigid spacers placed between the capsules.

9. The thermal energy storage system of claim 1, wherein said capsules comprise one or more of narrow-side spacers and broad-side spacers and wherein said spacers create a gap between said capsules when the capsules are packed together inside said ice brick.

10. The thermal energy storage system of claim 1, further comprising flexible spacers placed between the capsules, wherein the flexible spacers comprise flaps.

11. The thermal energy storage system of claim 10, wherein:
the capsules are generally box or plate shaped; and
the spacers are sized such that a free flow area between broad-sides of two capsules is in a range of 15% to 30% of a cross sectional area of a free flow area between the capsules without the spacers.

12. The thermal energy storage system of claim 1 wherein:
said ice brick further comprises a plurality of spacers inserted between said capsules;
said spacers ensure fluid flow of said first fluid through said ice brick; and
said spacers cause turbulent flow when the gap between said capsules increases when said second fluid melts.

13. The thermal energy storage system of claim 1, wherein said capsule comprises a quartz nucleating agent.

14. The thermal energy storage system of claim 1, wherein the capsule comprises heat transfer strips.

15. The thermal energy storage system of claim 14, wherein the heat transfer strips are made of material that has a thermal conductivity k of more than 75 W/(m*K) under standard conditions.

16. The thermal energy storage system of claim 1, wherein:
the capsules are generally box or plate shaped; and
the capsules comprise ridges such that the capsules are arranged to provide a space as flow channel for the first fluid in between the capsules.

17. The thermal energy storage system of claim 1, comprising a plurality of ice bricks, wherein:
a ratio of a combined length of the plurality of ice bricks to a flow-cut-area per capsule is in a range of about 40 to 200 cm/cm2;
the flow-cut-area is defined as a cross sectional free flow area for the first fluid in the ice brick per capsule.

18. The thermal energy storage system of claim 1, wherein said ice brick has an energy storage capacity of 15-23 TRH (Ton Refrigeration Hour).

19. A structure comprising an ice brick according to claim 1, wherein:
the structure is selected from a group consisting of:
a wall;
a floor; and
a roof.

20. The structure of claim 19, comprising a plurality of ice bricks are interconnected for fluid communication of the first fluid flowing through said ice bricks and wherein said ice bricks are stacked on top of one another.

21. A method of thermal energy storage comprising:
providing an ice brick according to claim 1; and
charging the ice brick by pumping said first fluid through said ice brick.

22. The method of claim 21, wherein:
said ice brick comprise an array of interconnected ice bricks;
said charging said ice brick comprises:
charging a first ice brick;
monitoring a temperature of said first fluid; and
transferring charging said ice brick from charging said first ice brick to charging a second ice brick based on said temperature.

23. A method of thermal energy storage comprising:
providing an ice brick according to claim 1; and
discharging the ice brick by pumping said first fluid through said ice brick.

24. The method of claim 23, wherein:
said ice brick comprise an array of interconnected ice bricks;
said discharging said ice brick comprises:
discharging a first ice brick;
monitoring a temperature of said first fluid; and
transferring discharging said ice brick from discharging said first ice brick to discharging a second ice brick based on said temperature.

\* \* \* \* \*